United States Patent
Zhao et al.

(10) Patent No.: US 9,906,545 B1
(45) Date of Patent: Feb. 27, 2018

(54) SYSTEMS AND METHODS FOR IDENTIFYING MESSAGE PAYLOAD BIT FIELDS IN ELECTRONIC COMMUNICATIONS

(71) Applicant: Symantec Corporation, Mountain View, CA (US)

(72) Inventors: Zhipeng Zhao, Sunnyvale, CA (US); Michael Pukish, Santa Clara, CA (US); Chaopin Zhu, Sunnyvale, CA (US); Preeti Agarwal, Los Altos, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 15/359,076

(22) Filed: Nov. 22, 2016

(51) Int. Cl.
    *G06F 11/00* (2006.01)
    *H04L 29/06* (2006.01)

(52) U.S. Cl.
    CPC ........ *H04L 63/1425* (2013.01); *H04L 63/123* (2013.01)

(58) Field of Classification Search
    CPC .................................................. H04L 63/1425
    USPC ........................................................ 726/23
    See application file for complete search history.

(56) References Cited

U.S. PATENT DOCUMENTS

| | | | |
|---|---|---|---|
| 7,015,811 B2 | 3/2006 | Decker et al. |
| 7,475,124 B2 | 1/2009 | Jiang et al. |
| 7,673,074 B1 | 3/2010 | Sebastian et al. |
| 7,861,300 B2 | 12/2010 | Arnold et al. |
| 8,104,090 B1 | 1/2012 | Pavlyushchik |
| 8,126,891 B2 | 2/2012 | Laxman et al. |
| 8,341,745 B1 | 12/2012 | Chau et al. |
| 8,544,087 B1 | 9/2013 | Eskin et al. |
| 8,566,938 B1 | 10/2013 | Prakash et al. |

(Continued)

FOREIGN PATENT DOCUMENTS

| | | |
|---|---|---|
| CN | 102571469 A | 7/2012 |
| CN | 102893289 A | 1/2013 |
| EP | 2515250 A1 | 10/2012 |

OTHER PUBLICATIONS

Mahoney, Network traffic anomaly detection based on packet bytes, Proceedings of the 2003 ACM symposium on Applied computing, pp. 346-350, Mar. 9, 2003.

(Continued)

*Primary Examiner* — Peter Shaw
(74) *Attorney, Agent, or Firm* — FisherBroyles, LLP

(57) ABSTRACT

The disclosed computer-implemented method for identifying message payload bit fields in electronic communications may include (i) monitoring messages transmitted via a network, (ii) selecting a plurality of messages transmitted via the network, each of the plurality of messages comprising an identical message identifier corresponding to a specified message type having a payload, (iii) determining for each bit position in the payload of the specified message type, a quasi-entropy value based on a proportion of occurrences of a first bit value and a proportion of occurrences of a second bit value at each corresponding bit position in the plurality of messages, and (iv) identifying at least one of a near-random bit field, a periodic bit field, and a constant bit field within the specified message type based on the determined quasi-entropy values. Various other methods, systems, and computer-readable media are also disclosed.

20 Claims, 8 Drawing Sheets

(56) References Cited

U.S. PATENT DOCUMENTS

| | | | |
|---|---|---|---|
| 8,925,037 | B2 | 12/2014 | Marino et al. |
| 8,973,133 | B1 | 3/2015 | Cooley |
| 9,053,516 | B2 | 6/2015 | Stempora |
| 9,088,560 | B1 | 7/2015 | Newstadt et al. |
| 9,141,790 | B2 | 9/2015 | Roundy et al. |
| 9,148,441 | B1 | 9/2015 | Tamersoy et al. |
| 9,166,997 | B1 | 10/2015 | Guo et al. |
| 9,256,739 | B1 | 2/2016 | Roundy et al. |
| 9,332,030 | B1 | 5/2016 | Pereira |
| 9,384,066 | B1 * | 7/2016 | Leita .................. G06F 9/54 |
| 9,473,380 | B1 * | 10/2016 | Bermudez ............ H04L 43/18 |
| 9,529,990 | B2 | 12/2016 | Newstadt et al. |
| 9,582,669 | B1 | 2/2017 | Shen et al. |
| 2004/0044771 | A1 | 3/2004 | Allred et al. |
| 2004/0059822 | A1 | 3/2004 | Jiang et al. |
| 2005/0030969 | A1 * | 2/2005 | Fredriksson ......... H04Q 3/5455 |
| | | | 370/454 |
| 2005/0138413 | A1 | 6/2005 | Lippmann et al. |
| 2006/0095573 | A1 | 5/2006 | Carle et al. |
| 2006/0236374 | A1 | 10/2006 | Hartman |
| 2008/0134327 | A1 | 6/2008 | Bharrat et al. |
| 2009/0144308 | A1 | 6/2009 | Huie et al. |
| 2009/0157365 | A1 | 6/2009 | Higuchi et al. |
| 2010/0186088 | A1 | 7/2010 | Banerjee et al. |
| 2010/0192226 | A1 | 7/2010 | Noel et al. |
| 2010/0235879 | A1 | 9/2010 | Burnside et al. |
| 2011/0019774 | A1 | 1/2011 | Furuta |
| 2011/0047620 | A1 | 2/2011 | Mahaffey et al. |
| 2011/0083180 | A1 | 4/2011 | Mashevsky et al. |
| 2011/0302656 | A1 | 12/2011 | El-Moussa |
| 2011/0314546 | A1 | 12/2011 | Aziz et al. |
| 2011/0320617 | A1 | 12/2011 | Annarnalaisami et al. |
| 2012/0144468 | A1 | 6/2012 | Pratt et al. |
| 2012/0233683 | A1 | 9/2012 | Ibrahim et al. |
| 2013/0031037 | A1 | 1/2013 | Brandt et al. |
| 2013/0042294 | A1 | 2/2013 | Colvin et al. |
| 2013/0212659 | A1 | 8/2013 | Maher et al. |
| 2013/0333032 | A1 | 12/2013 | Delatorre et al. |
| 2014/0226664 | A1 | 8/2014 | Chen et al. |
| 2014/0258379 | A1 | 9/2014 | L'Heureux et al. |
| 2014/0365646 | A1 | 12/2014 | Xiong |
| 2015/0113638 | A1 | 4/2015 | Valasek et al. |
| 2015/0150124 | A1 | 5/2015 | Zhang et al. |
| 2015/0261655 | A1 * | 9/2015 | Versteeg ............. G06F 11/3664 |
| | | | 717/134 |
| 2015/0281047 | A1 | 10/2015 | Raju et al. |
| 2016/0261482 | A1 | 9/2016 | Mixer et al. |
| 2017/0118234 | A1 | 4/2017 | Arora et al. |

OTHER PUBLICATIONS

Balthrop et al., Revisiting LISYS: Parameters and Normal Behavior, Proceedings of the 2002 Congress on Evolutionary Computation, pp. 1045-1050, May 12, 2002.

Lee et al,, Data mining approaches for intrusion detection, Proceedings of the 7th conference on USENIX Security Symposium—vol. 7, p. 6, Jan. 26, 1998.

Clifton et al., Developing custom intrusion detection filters using data mining, MILCOM 2000. 21st Century Military Communications Conference Proceedings, vol. 1, pp, 440-443, Oct. 22, 2000.

Bloedorn et al., Data Mining for Improving Intrusion Detection, http://www.mitre.org/sites/default/files/pdf/bloedorn_spss.pdf, Sep. 18, 2015.

Lee et al., Information-theoretic measures for anomaly detection, 2001 IEEE Symposium on Security and Privacy, pp. 130-143, May 13, 2001.

Yang et al., Anomaly detection and diagnosis in grid environments, Proceedings of the 2007 ACM/IEEE conference on Supercomputing, p. 33, Nov. 10, 2007.

Wang et al., Anomalous Payload-Based Network Intrusion Detection, Seventh International Workshop on Recent Advances in Intrusion Detection, pp. 203-222, Sep. 15, 2004.

Dussel et al., Cyber-Critical Infrastructure Protection Using Real-Time Payload-Based Anomaly Detection, 4th International Workshop on Critical Information Infrastructures Security, pp, 85-97, Sep. 30, 2009.

Tongaonkar et al., Towards self adaptive network traffic classification, Computer Communications, vol. 56. pp. 35-46, Feb. 1, 2015.

Bermudez et al., Automatic protocol field inference for deeper protocol understanding, IFIP Networking Conference (IFIP Networking), 2015, pp. 1-9, May 20, 2015.

Pukish et al., U.S. Appl. No. 15/194,337, filed Jun. 27, 2016.

Taylor et al., Frequency-based anomaly detection for the automotive CAN bus, 2015 World Congress on Industrial Control Systems Security (WCICS), pp. 45-49, Dec. 14, 2015.

Theissler, Anomaly detection in recordings from in-vehicle networks.pdf, Big Data Applications and Principles, First International Workshop, BIGDAP 2014, Madrid, Spain, Sep. 11, 2014.

Muter et al., A structured approach to anomaly detection for in-vehicle networks, 2010 Sixth International Conference on Information Assurance and Security (IAS), Atlanta, GA, pp. 92-98, Aug. 23, 2010.

Kleberger; Security Aspects of the In-Vehicle Network in the Connected Car; Intelligent Vehicles Symposium (IV), 2011 IEEE, Baden-Baden, Germany, reference: pp. 528-533, Jun. 5-9, 2011.

Muter; Entropy-based anomaly detection for in-vehicle networks; 2011 IEEE Intelligent Vehicles Symposium (IV), DOI: 10.1109/IVS.2011.5940552, Baden-Baden, Germany, reference: pp. 1110-1115, Jun. 5-9, 2011

Bayer; Automotive Security Testing—The Digital Crash Test; http://www.sia.fr/images/images/Image/Evenements/2014/CESA/available%20papers/09_Bayer_Escrypt.pdf, as accessed Feb. 9, 2015; 3rd CESA Automotive Electronics Congress (CESA 3.0), Paris, France, Dec. 3-4, 2014.

Ben Othmane; Towards Extended Safety in Connected Vehicles; Proceedings of the 16th International IEEE Annual Conference on Intelligent Transportation Systems (ITSC 2013), The Hague, The Netherlands, Oct. 6-9, 2013

Bourns Type 6002 Non-contacting Steering Angle Sensor; http://www.we-conect.com/cms/media/uploads/events/415/dokumente/Bourns_-_Non-Contacting_Steering_Angle_Sensor_Type_6002.pdf, as accessed Aug. 29, 2014, on or before Aug. 29, 2014.

CAN protocol specification; http://www.can-cia.org/index.php?id=164, as accessed Aug. 29, 2014, Oct. 17, 2010.

Controller Area Network (CAN) Overview; http://www.ni.com/white-paper/2732/en/, as accessed Aug. 29, 2014; National Instruments Corporation, Aug. 1, 2014.

Driver Feedback; https://play.google.com/store/apps/details?id=com.statefarm.driverfeedback, as accessed Aug. 29, 2014; State Farm Insurance, Android Apps on Google Play, Jun. 2, 2013.

Electronic control unit; https://en.wikipedia.org/wiki/Electronic_control_unit, as accessed Feb. 9, 2015; Wikipedia, Jul. 28, 2004.

EMI/ESD Protection Solutions for the CAN Bus; http://www.onsemi.com/pub_link/Collateral/AND8169-D.PDF, as accessed Aug. 29, 2014; Publication Order No. AND8169/D, ON Semiconductor, Semiconductor Components Industries, LLC, Jun. 2014—Rev. 2.

Emulation; https://en.wikipedia.org/wiki/Emulation, as accessed Feb. 9, 2015; Wikipedia, Dec. 3, 2003.

FlexRay Automotive Communication Bus Overview; http://www.ni.com/white-paper/3352/en/, as accessed Aug. 29, 2014; National Instruments Corporation, Aug. 21, 2009.

Hardware emulation; https://en.wikipedia.org/wiki/Hardware_emulation, as accessed Feb. 9, 2015; Wikipedia, Sep. 13, 2006.

Koscher; Experimental Security Analysis of a Modern Automobile; http://www.autosec.org/pubs/cars-oakland2010.pdf, as accessed Feb. 9, 2015; 2010 IEEE Symposium on Security and Privacy, 2010.

Lepkowski; EMI/ESD protection solutions for the CAN bus; http://www.can-cia.org/fileadmin/cia/files/icc/10/cia_paper_lepkowski.pdf, as accessed Aug. 29, 2014; iCC 2005, CAN in Automation, 2005.

(56) References Cited

OTHER PUBLICATIONS

Miller; A Survey of Remote Automotive Attack Surfaces; http://www.ioactive.com/pdfs/Remote_Automotive_Attack_Surfaces.pdf, as accessed Aug. 29, 2014; Black Hat USA 2014, Las Vegas, NV, Aug. 2-7, 2014.

Nathan Evans, et al; Systems and Methods for Detecting Anomalous Messages in Automobile Networks; U.S. Appl. No. 14/525,792; filed Oct. 28, 2014.

Nathan Evans, et al; Systems and Methods for Evaluating Electronic Control Units Within Vehicle Emulations; U.S. Appl. No. 14/671,036, filed Mar. 27, 2015.

Regev; Automotive Ethernet Security Testing; http://standards.ieee.org/events/automotive/2014/20_Automotive_Ethernet_Security_Testing.pdf, as accessed Feb. 9, 2015, 2014.

Snapshot; https://www.progressive.com/auto/snapshot/, as accessed Aug. 29, 2014; Progressive Casualty Insurance Company, Mar. 8, 2013.

Vehicle bus; https://en.wikipedia.org/wiki/Vehicle_bus, as accessed Feb. 9, 2015; Wikipedia, May 12, 2005.

Volvo tests Cloud-based V2V ice warning concept; http://telematicsnews.info/2014/03/19/volvo-tests-cloud-based-v2v-ice-warning-sharing_m5202/, as accessed Aug. 29, 2014; Telematics News, Mar. 19, 2014.

Wolf; Security in Automotive Bus Systems; http://www.weika.eu/papers/WolfEtAl_SecureBus.pdf, as accessed Aug. 29, 2014, 2004.

Yun Shen, et al; Systems and Methods for Detecting Discrepancies in Automobile-Network Data; U.S. Appl. No. 14/525,715, filed Oct. 28, 2014.

Bajpai, et al; Systems and Methods for Detecting Suspicious Microcontroller Messages; U.S. Appl. No. 15/143,284, filed Apr. 29, 2016.

Michael Pukish, et al; Systems and Methods for Detecting Transactional Message Sequences That Are Obscured in Multicast Communications; U.S. Appl. No. 15/194,337, filed Jun. 27, 2016.

Vishal Bajpai et al;. System and Method for Identifying an Invalid Packet on a Controller Area Network (CAN) Bus; U.S. Appl. No. 15/056,864, filed Feb. 29, 2016.

Adam Glick, et al.; Systems and Methods for User-Directed Malware Remediation; U.S. Appl. No. 13/419,360, filed Mar. 13, 2012.

Carey Nachenberg, et al.; Systems and Methods for Neutralizing File-Format-Specific Exploits Included Wthin Files Contained Within Electronic Communications; U.S. Appl. No. 13/418,332, filed Mar. 12, 2012.

Leylya Yumer, et al.; Systems and Methods for Analysing Zero-Day Attacks; U.S. Appl. No. 13/901,977, filed May 24, 2013.

Kyumin Lee, et al.; Content-Driven Detection of Campaigns in Social Media; CIKM'11; Oct. 24-28, 2011; ACM; Glasgow, Scotland, UK; http://faculty.cs.tamu.edu/caverlee/pubs/lee11cikm.pdf, as accessed Aug. 8, 2013.

Monowar H. Bhuyan, et al.; AOCD: An Adaptive Outlier Based Coordinated Scan Detection Approach; International Journal of Network Security; Nov. 2012; pp. 339-351; vol. 14, No. 6; http://www.cs.uccs.edu/~jkalita/papers/2012/BhuyanMonowarIJNS2012.pdf, as accessed Aug. 8, 2013.

William Eberle, et al., Graph-based approaches to insider threat detection; CSIIRW '09 Proceedings of the 5th Annual Workshop on Cyber Security and Information Intelligence Research: Cyber Security and Information Intelligence Challenges and Strategies; 2009; Article No. 44; ACM; http://dl.acm.org/citation.cfm?id=1558658, as accessed Aug. 8, 2013.

Splunk, Inc.; Detecting Advanced Persistent Threats—Using Spunk for APT; Jan. 4, 2012; Tech Brief; http://www.splunk.com/web_assets/pdfs/secure/Splunk_for_APT_Tech_Brief.pdf, as accessed Aug. 8, 2013.

Triumfant Inc.; Detecting the Advanced Persistent Threat; Nov. 30, 2010; www.triumfant,com/advanced_persistent_threatasp, as accessed Aug. 8, 2013.

EMC Corporation; Advanced Persistent Threat (APT) and Rootkit Detection; 2012; http://www.siliciumsecurity.com/advanced-persistent-threats-and-rootkits-detection/, as accessed Aug. 8, 2013.

Fanglu Guo, et al; Systems and Methods for Reducing False Positives When Using Event-Correlation Graphs to Detect Attacks on Computing Systems; U.S. Appl. No. 14/031,044, filed Sep. 19, 2013.

Colombe, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer Society, ACM, New York, NY, (2004), 138-142.

Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.

Julisch, Klaus "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.

Treinen, James J., et al, "A framework for the application of association rule mining in large intrusion detection infrastructures", http://dl.acm.org/citation.cfm?id=2166375, as accessed Nov. 13, 2013, RAID'06 Proceedings of the 9th international conference on Recent Advances in Intrusion Detection, Springer-Verlag Berlin, Heidelberg, (2006), 1-18.

Gu, Guofei et al., "BotHunter: detecting malware infection through IDS-driven dialog correlation", http://dl.acm.org/citation.cfm?id=1362915, as accessed Nov. 13, 2013, SS'07 Proceedings of 16th USENIX Security Symposium on USENIX Security Symposium, Article No. 12, USENIX Association, Berkeley, CA, (2007).

Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.

Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).

Zamlot, Loai et al., "Prioritizing intrusion analysis using Dempster-Shafer theory", http://dl.acm.org/citation.cfm?id=2046694, as accessed Nov. 13, 2013, AlSec '11 Proceedings of the 4th ACM workshop on Security and artificial intelligence, ACM, New York, NY, (2011), 59-70.

Oliner, Adam J., et al, "Community epidemic detection using time-correlated anomalies", http://dl.acm.org/citation.cfm?id=1894191, as accessed Nov. 13, 2013, RAID'10 Proceedings of the 13th international conference on Recent advances in intrusion detection, Springer-Verlag Berlin, Heidelberg, (2010), 360-381.

Ning, Peng et al., "Constructing attack scenarios through correlation of intrusion alerts", http://reeves-students.csc.ncsu.edu/papers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.

Wang, Wei et al., "A Graph Based Approach Toward Network Forensics Analysis", http://dl.acm.org/citation.cfm?id=1410238, as accessed Nov. 13, 2013, ACM Transactions on Information and System Security (TISSEC), vol. 12, Issue 1, Article No. 4, ACM, New York, NY, (Oct. 2008).

Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004), 146-169.

Tedesco, Gianni et al., "Real-Time Alert Correlation with Type Graphs", http://dl.acm.org/citation.cfm?id=1496279, as accessed Nov. 13, 2013, ICISS '08 Proceedings of the 4th International Conference on Information Systems Security, Springer-Verlag Berlin, Heidelberg, (2008), 173-187.

(56) References Cited

OTHER PUBLICATIONS

Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).
Wang, Ting et al., "Microscopic Social Influence", http://www.cc.gatech.edu/~lingliu/papers/2012/TingWang-SDM2012.pdf, as accessed Nov. 13, 2013, SDM 2012, (2012).
Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).
Ayday, Erman et al., "Iterative Trust and Reputation Management Using Belief Propagation", http://www.ece.gatech.eduiresearchilabs/WCCL/BL_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.
Bruce McCorkendale, et al; Systems and Methods for Detecting Malware; U.S. Appl. No. 13/422,702, filed Mar. 16, 2012
Alar Tamersoy, et al; Systems and Methods for Adjusting Suspiciousness Scores in Event-Correlation Graphs; U.S. Appl. No. 14/138,891, filed Dec. 23, 2013.
Paleari, Roberto et al., "Automatic Generation of Remediation Procedures for Malware Infections", https://www.usenix.org/legacy/event/sec10/tech/full_papers/Paleari.pdf. as accessed Feb. 6, 2014, USENIX Security'10 Proceedings of the 19th USENIX conference on Security, USENIX Association, Berkeley, CA, (2010).
"Combating Advanced Persistant Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).
"Advanced Persistent Threat (APT) Attack & Zero-Day Protection", http://www.fireeye.com/ as accessed Feb. 6, 2014, FireEye, Inc., (2006).
"Advanced Threat Defense", http://www.fidelissecurity.com/advanced-persisent-threat-protection, as accessed Feb. 6, 2014, General Dynamics Fidelis Cybersecurity Solutions, Inc., (2013).
"Mandiant for Security Operations", https://www.mandiant.com/products/mandiant-platform/security-operations, as accessed Feb. 6, 2014, Mandiant, A FireEye Company, (Mar. 1, 2013).
"Mandiant for Intelligent Response", http://www.mandiant.com/products/mandiant-platform/intelligent-response, as accessed Feb. 6, 2014, Maniant, A FireEye Company, (Mar. 1, 2013).
"Solera Networks Inc.", http://www.soleranetworks.com/, as accessed Feb. 6, 2014, (Feb. 16, 2005).
"LogRhythm, Inc.", http://www.logrhythm.com/, as accessed Feb. 6, 2014, (Oct. 18, 2000).
Kevin Alejandro Roundy, et al; Systems and Methods for Using Event-Correlation Graphs to Generate Remediation Procedures; U.S. Appl. No. 14/221,703, filed Mar. 21, 2014.
Eberle, William et al., "Insider Threat Detection Using Graph-Bases Approaches", http://www.eecs.edu/-holder/pubs/EberleCATCH09.pdf, Cybersecurity Applications & Technology Conference for Homeland Security, (Jan. 2009).
Constantin, Lucian, "Attackers used known exploit to steal customer log-in credentials, vBulletin maker says", http://www.networkworld.com/article/2171967/access-control/attackers-used-known-exploit-to-steal-customer-log-in-credentials-vbulletin-maker-sa.html, IDG News Service, Network World, (Nov. 18, 2013).
"Recovery Manager for Active Directory Forest Edition", http://software.dell.com/documents/recovery-manager-for-active-directory-forest-edition-datasheet-26622.pdf, Dell, Inc., (Nov. 2013).
Scarfone, Karen et al., "Guide to Intrusion Detection and Prevention Systems (IDPS)", http://csrc.nist.gov/publications/nistpubs/800-94/SP800-94, National Institute of Standards and Technology, Special Publication 800-94, (Feb. 2007).

Dezert, Jean et al., "On the Validity of Dempster-Shafer Theory", Fusion 2012—15th International Conference on Information Fusion, Singapour, Singapore, (Jul. 2012).
Kevin Roundy, et al; Systems and Methods for Using Event-Correlation Graphs to Detect Attacks on Computing Systems; U.S. Appl. No. 14/041,762, filed Sep. 30, 2013.
Ilya Sokolov, et al; Systems and Methods for Notifying Contacts About the Status of Persons Impacted by Significant Unforeseen Events; U.S. Appl. No. 14/525,244, filed Oct. 28, 2014.
"Google now", http://www.google.com/landing/now/#whatisit, as accessed Aug. 28, 2014, (Jun. 28, 2012).
"Bing Maps", http://www.bing.com/maps/, as accessed Aug. 28, 2014, (Jun. 11, 2009).
"Google Now", https://plus.google.com/+google/posts/WhNRboMLynU, as accessed Aug. 18, 2015, (Mar. 29, 2014).
Keith Newstadt, et al; Systems and Methods for Validating Login Attempts Based on User Location; U.S. Appl. No. 14/197,687, filed Mar. 5. 2014.
Keith Newstadt; Systems and Methods for Validating Login Attempts Based on User Location; U.S. Appl. No. 14/735,195, filed Jun. 10, 2015.
Michael Shavell, et al; Systems and Methods for Storing Information About Transmission Control Protocol Connections; U.S. Appl. No. 14/314,263, filed Jun. 25, 2014.
Haas, Juergen; SYN flood; http://linux.about.com/ics/linux101/g/synflood.htm, as accessed Jul. 10, 2014; About.com.
Shane Pereira; Systems and Methods for Thwarting Illegitimate Initialization Attempts; U.S. Appl. No. 14/485,287, filed Sep. 12, 2014.
Hobgood, et al., Advanced Automatic Crash Notifications and, Urgency Factors: Can We Standardize?, APCO 2011; PowerPoint Slides, Jul. 22, 2012.
Asi, et al, Black Box System Design, Dec. 14, 2010.
Ignacio Bermudez Corrales, et al; Systems and Methods for Identifying Compromised Devices Within Industrial Control Systems; U.S. Appl. No. 14/952,344, filed Nov. 25, 2015.
Bolzoni; Poseidon: a 2-tier Anomaly-based Intrusion Detection System; http://doc.utwente.nl/54544/1/00000150.pdf, as accessed Sep. 29, 2015; International Workshop on Information Assurance, IEEE, London.
Caselli; Sequence-aware Intrusion Detection in Industrial Control Systems; CPSS'15, Proceedings of the 1st ACM Workshop on Cyber-Physical System Security, 2015.
Cisco Anomaly Guard Module; http://www.cisco.com/c/en/us/products/collateral/interfaces-modules/catalyst-6500-7600-router-anomaly-guard-module/product_data_sheet0900aecd80220a7c.html, as accessed Sep. 29, 2015; Document ID1457308823644728.
Distributed control system; https://en.wikipedia.org/wiki/Distributed_control_system, as accessed Sep. 29, 2015; Wikipedia.
Garitano; A Review of SCADA Anomaly Detection Systems; Advances in Intelligent and Soft Computing, 2016.
Ginter; Experience with Network Anomaly Detection on Industrial Networks; Industrial Control Systems Joint Working Group (ICSJWG), 2010.
Hadziosmanovi; N-Gram against the Machine: On the Feasibilty of the N-Gram Network Analysis for Binary Protocols; Research in Attacks, Intrusions, and Defenses. 2012.
Kiss; Data Clustering-based Anomaly Detection in Industrial Control Systems; Intelligent Computer Communication and Processing, IEEE. 2014.
Mahoney; Phad: Packet Header Anomaly Detection for Identifying Hostile Network Traffic; https://cs.fit.edu/~mmahoney/paper3.pdf, as accessed Sep. 29, 2015.
Mantere; Network Traffic Features for Anomaly Detection in Specific Industrial Control System Network; Future Internet 2013, vol. 5 (6), MDPI.
Perdisci; McPad : A Multiple Classifier System for Accurate Payload-based Anomaly Detection; https://pralab.diee.unica.it/sites/default/files/Perdisci_COMNET2009.pdf, as accessed Sep. 29, 2015; Computer Networks, vol. 53, Issue 6.
Snort (software); https://en.wikipedia.org/wiki/Snort_(software), as accessed Sep. 29, 2015; Wikipedia.

(56) References Cited

OTHER PUBLICATIONS

The Bro Network Security Monitor; https://www.bro.org/, as accessed Sep. 29, 2015.
Wang; Anagram: A Content Anomaly Detector Resistant to Mimicry Attack; https://mice.cs.columbia.edu/getTechreport.php?techreportID=403&format=pdfat, as accessed Sep. 29, 2015; Recent Advances in Intrusion Detection.
Wang; Anomalous Payload-based Network Intrusion Detection; http://www.covert.oi/research-papers/security/PAYL%20-%20Anomalous%20Payload-based%20Network%20Intrusion%20Detection.pdf, as accessed Sep. 29, 2015; Recent Advances in Intrusion Detection.
Walter Bogorad; Systems and Methods for Detecting Anomalies That Are Potentially Indicative of Malicious Attacks; U.S. Appl. No. 15/059,326, filed Mar. 3, 2016.
Aggarwal; Outlier Analysis; http://www.springer.com/us/book/9781461463955, as accessed Feb. 1, 2016, (2013).
Dunning; Practical Machine Learning: A New Look at Anomaly Detection; https://www.mapr.com/practical-machine-learning-new-look-anomaly-detection, as accessed Feb. 1, 2016, (Jul. 21, 2014).
Kind; Histogram-based traffic anomaly detection; http://ieeexplore.ieee.org/document/5374831/?arnumber=5374831, as accessed Feb. 1, 2016; IEEE Transactions on Network and Service Management, vol. 6, Issue 2, (Jun. 2009).
Wang; Network anomaly detection: A survey and comparative analysis of stochastic and deterministic methods; http://ieeexplore.ieee.org/document/6759879/?arnumber=6759879, as accessed Feb. 1, 2016; 2013 IEEE 52nd Annual Conference on Decision and Control (CDC), (Dec. 10-13, 2013).
Yolacan; Learning From Sequential Data for Anomaly Detection; https://repository.library.northeastern.edu/downloads/neu:349795, as accessed Feb. 1, 2016; Dissertation, (Oct. 2014).
Michael Sylvester Pukish, et al; Systems and Methods for Detecting Obscure Cyclic Application-Layer Message Sequences in Transport-Layer Message Sequences; U.S. Appl. No. 15/271,494, filed Sep. 21, 2016.
K. Nyalkalkar et al., "A comparative study of two network-based anomaly detection methods," in 2011 Proceedings IEEE Infocom, 2011.
S. Sinha et al., "WIND: Workload-Aware INtrusion Detection," in Recent Advances in Intrusion Detection, D. Zamboni and C. Kruegel, Eds. Springer Berlin Heidelberg, 2006.
L. Huang et al., "In-network PCA and anomaly detection," in in NIPS, 2006.
N. Goldenberg et al., "Accurate modeling of Modbus/TCP for intrusion detection in SCADA systems," Int. J. Crit. Infrastruct. Prot, vol. 6, No. 2, Jun. 2013.
M.-K. Yoon et al., "Communication Pattern Monitoring: Improving the Utility of Anomaly Detection for Industrial Control Systems," in Internet Society, San Diego, CA, USA, 2014.
N. Borisov et al., "Generic Application-Level Protocol Analyzer and its Language," Microsoft Research, MSR-TR-2005-133, Feb. 2005.
"Transmission Control Protocol", http://en.wikipedia.org/wiki/Transmission_Control_Protocol, as accessed Jul. 10, 2014, Wikipedia, (Dec. 18, 2003).
A. Greenberg, "Hackers Remotely Kill a Jeep on the Highway—With Me in It," Wired, Jul. 21, 2015. [Online]. Available: http://www.wired.com/2015/07/hackers-remotely-kill-jeep-highway/. [Accessed: Mar. 30, 2016].
Extending schedulability analysis of Controller Area Network (CAN) for mixed (periodic/sporadic) messages (http://ieeexplore.ieee.org/document/6059010/); Sep. 5, 2011.
A structured approach to anomaly detection for in-vehicle networks (http://ieeexplore.ieee.org/stamp/stamp.jsp?arnumber=5604050); Aug. 23, 2010.
Intrusion Detection Systems (IDS) Part 2—Classification; methods; techniques (http://www.windowsecurity.com/articles-tutorials/intrusion_detection/IDS-Part2-Classification-methods-techniques.html); Jun. 15, 2014.
Vishal Bajpai et al.; System and Method for Identifying an Invalid Packet on a Controller Area Network (CAN) Bus; U.S. Appl. No. 15/056,864, filed Feb. 29, 2016.
Vishal Bajpai et al.; Systems and Methods for Identifying Suspicious Controller Area Network Messages; U.S. Appl. No. 15/587,762, filed May 5, 2017.
Steven Noel et al., "Correlating Intrusion Events and Building Attack Scenarios Through Attack Graph Distances", Computer Security Applications Conference, 2004. 20th Annual Tucson, AZ, USA Dec. 6-10, 2004, (Dec. 10, 2004), pp. 350-359.

* cited by examiner

SYSTEMS AND METHODS FOR IDENTIFYING MESSAGE PAYLOAD BIT FIELDS IN ELECTRONIC COMMUNICATIONS

BACKGROUND

With rise of the Internet of Things (IOT), an increasing number of everyday devices are networked and continuously sending and receiving messages. Such devices may be manufactured by a variety of different vendors and may communicate using proprietary message formats. Controller Area Network (CAN) Bus systems, for example, are utilized in most modern automobiles to relay messages between different components in the automobiles. Although CAN bus systems utilize a common transport layer format to relay messages between devices (e.g., audio system components, brake system components, etc.) within an automobile, the messages often carry unique proprietary binary payload sub-formats and each include only a CAN identifier (CAN ID) and/or CAN bus identifier (Bus ID) with no source or destination information. Such messages may allow for efficient transmission of information between devices.

Detecting anomalies in messages may be useful for identifying various threats, such as, for example, intrusion by malicious parties or device malfunction or failure. However, anomaly detection, such as signature-based intrusion detection, is often unfeasible because the real-time flow of messages between devices may overwhelm available processing and storage limitations. Additionally, anomaly detection may be further complicated by the use of proprietary message formats that are not publicly available, making discovery and monitoring of the ground-truth binary schema for each message unfeasible for use with high-traffic networks. The instant disclosure, therefore, identifies and addresses a need for systems and methods for identifying message payload bit fields in electronic communications.

SUMMARY

As will be described in greater detail below, the instant disclosure describes various systems and methods for identifying message payload bit fields in electronic communications.

In one example, a computer-implemented method for identifying message payload bit fields in electronic communications may include (i) monitoring, at the computing device, messages transmitted via a network, (ii) selecting, at the computing device, a plurality of messages transmitted via the network, each of the plurality of messages comprising an identical message identifier corresponding to a specified message type having a payload, (iii) determining, at the computing device, for each bit position in the payload of the specified message type, a quasi-entropy value based on a proportion of occurrences of a first bit value and a proportion of occurrences of a second bit value at each corresponding bit position in the plurality of messages, and (iv) identifying, at the computing device, at least one of a near-random bit field, a periodic bit field, and a constant bit field within the specified message type based on the determined quasi-entropy values.

In some embodiments, the computer-implemented method may further include (i) determining, at the computing device, for each bit position of a plurality of bit positions in the payload of the specified message type, a bit flip rate value based on the occurrences of the first bit value and the occurrences of the second bit value at each corresponding bit position in the plurality of messages, and (ii) identifying, at the computing device, at least one continuous bit field within the specified message type based on the determined bit flip rate values. The plurality of bit positions in the payload of the specified message type may include bit positions that are not located within the at least one of the near-random bit field, the periodic bit field, and the constant bit field. In one embodiment, identifying the at least one continuous bit field may include identifying a boundary of a continuous bit field by detecting an increase in a bit flip rate at a bit position in comparison with an adjacent bit position. The bit position at which the increase in the bit flip rate is identified may include a bit position following the adjacent bit position when proceeding bit-wise from a least significant bit position to a most significant bit position. Identifying the at least one continuous bit field may include identifying a boundary of a continuous bit field that is adjacent to the at least one of the near-random bit field, the periodic bit field, and the constant bit field.

In at least one embodiment, the computer-implemented method may further include generating, at the computing device, a model based on the at least one continuous bit field and the at least one of the near-random bit field, the periodic bit field, and the constant bit field. The computer-implemented method may additionally include (i) detecting, at the computing device, an additional message of the specified message type transmitted via the network, and (ii) determining, at the computing device, based on the model, whether the additional message includes at least one anomaly. In some examples, the computer-implemented method may further include performing a security action in response to determining that the additional message includes at least one anomaly. The computer-implemented method may additionally include (i) detecting, at the computing device, at least one additional message of the specified message type transmitted via the network, and (ii) updating, at the computing device, the model based on the at least one additional message. In one example, the computer-implemented method may further include changing, at the computing device, a boundary of at least one of the at least one continuous bit field and the at least one of the near-random bit field, the periodic bit field, and the constant bit field based on the at least one additional message.

In some embodiments, the computer-implemented method may include (i) detecting, at the computing device, an additional message of the specified message type transmitted via the network, and (ii) identifying, at the computing device, the at least one of the near-random bit field, the periodic bit field, and the constant bit field within the additional message. In at least one example, the network may include a controller area network bus. The message identifier corresponding to the specified message type may include a controller area network identifier.

In one embodiment, determining, for each bit position in the payload of the specified message type, the quasi-entropy value may further include multiplying a relative proportion of the first bit value at each corresponding bit position in the plurality of messages by a relative proportion of the second bit value at each corresponding bit position in the plurality of messages. In at least one example, determining, for each bit position in the payload of the specified message type, the quasi-entropy value may further include calculating the quasi-entropy value according to the following Equation (1):

$$QE = K \times (p_0 \times p_1)^2 \quad (1)$$

where QE is the quasi-entropy value, K is a constant value, $p_0$ is a ratio of the total number of occurrences of the first bit value to the total number of messages of the plurality of messages; and $p_1$ is a ratio of the total number of occurrences of the second bit value to the total number of messages of the plurality of messages.

In some embodiments, identifying at least one of a near-random bit field, a periodic bit field, and a constant bit field within the specified message type based on the determined quasi-entropy values may further include identifying, at the computing device, at least one of the near-random bit field and the periodic bit field by identifying two or more consecutive bit fields having a quasi-entropy value that is greater than or equal to a threshold value. In at least one embodiment, identifying at least one of a near-random bit field, a periodic bit field, and a constant bit field within the specified message type based on the determined quasi-entropy values may further include identifying, at the computing device, the constant bit field by identifying two or more consecutive bit fields having a quasi-entropy value that is equal to zero.

In one embodiment, a system for identifying message payload bit fields in electronic communications may include several modules stored in memory, including (i) a monitoring module, stored in memory, that monitors, at a computing device, messages transmitted via a network, (ii) a selecting module, stored in memory, that selects, at the computing device, a plurality of messages transmitted via the network, each of the plurality of messages comprising an identical message identifier corresponding to a specified message type having a payload, (iii) a determining module, stored in memory, that determines, at the computing device, for each bit position in the payload of the specified message type, a quasi-entropy value based on a proportion of occurrences of a first bit value and a proportion of occurrences of a second bit value at each corresponding bit position in the plurality of messages, (iv) an identifying module, stored in memory, that identifies, at the computing device, at least one of a near-random bit field, a periodic bit field, and a constant bit field within the specified message type based on the determined quasi-entropy values, and (v) at least one physical processor that executes the monitoring module, the selecting module, the determining module, and the identifying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) monitor messages transmitted via a network, (ii) select a plurality of messages transmitted via the network, each of the plurality of messages comprising an identical message identifier corresponding to a specified message type having a payload, (iii) determine, for each bit position in the payload of the specified message type, a quasi-entropy value based on a proportion of occurrences of a first bit value and a proportion of occurrences of a second bit value at each corresponding bit position in the plurality of messages, and (iv) identify at least one of a near-random bit field, a periodic bit field, and a constant bit field within the specified message type based on the determined quasi-entropy values.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
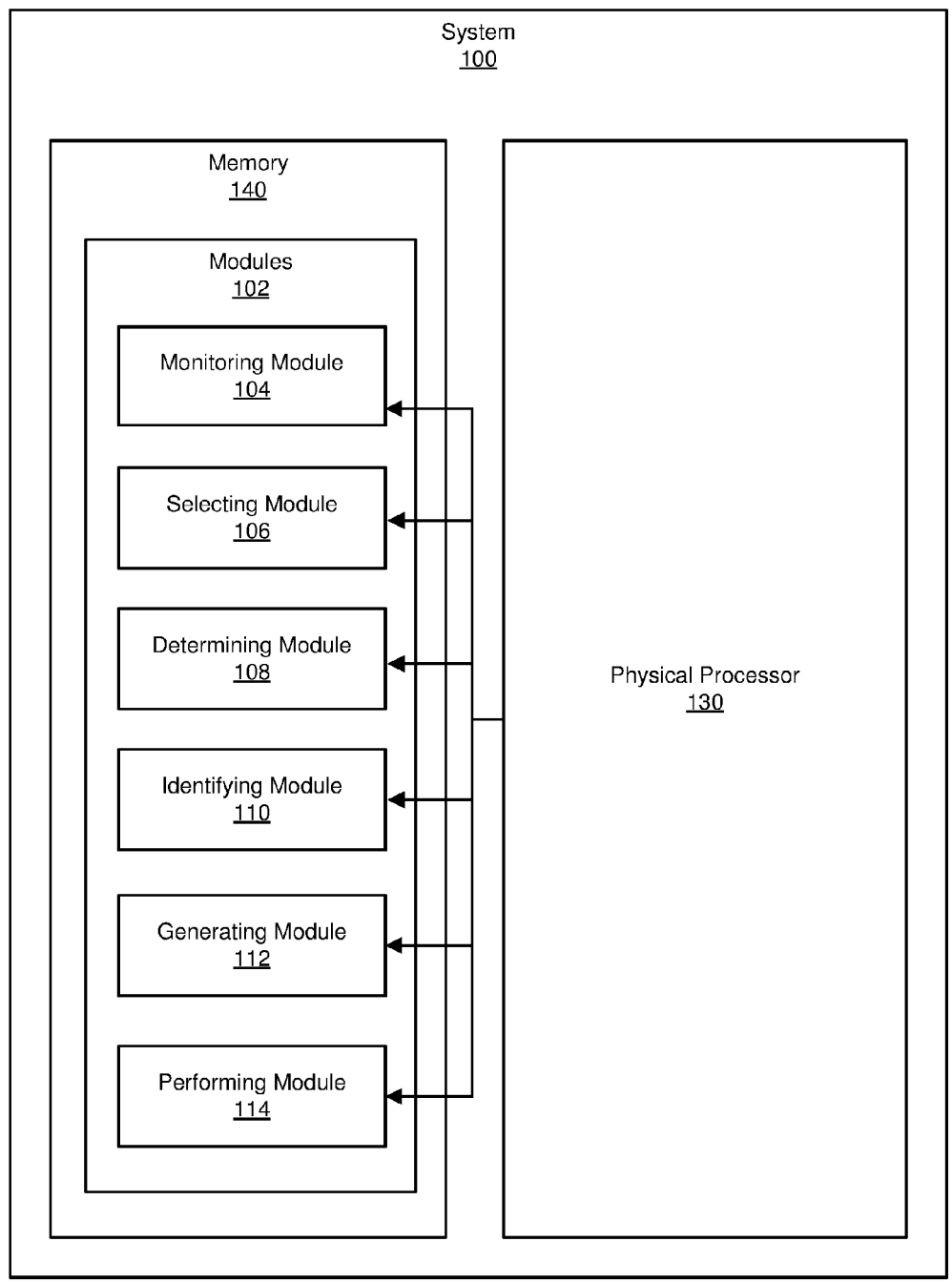
FIG. 1 is a block diagram of an example system for identifying message payload bit fields in electronic communications.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for identifying message payload bit fields in electronic communications. As will be explained in greater detail below, the systems and methods described herein may monitor messages that are transmitted via a network and parse message payloads of various message types into distinct bit fields. The disclosed systems and methods may enable identification of message payload bit fields in a manner that is computationally efficient and accurate and that does not require reverse-engineering of messages in order to discover a ground truth field schema for the messages. The parsed message payloads may be used to model message payload fields for various message types and monitor subsequent messages for anomalies based on variations in values and patterns detected in the subsequent messages.

The systems and methods may thus be utilized for detecting and modeling a variety of message types, including proprietary message formats and/or otherwise unknown message formats.

Figure 2:
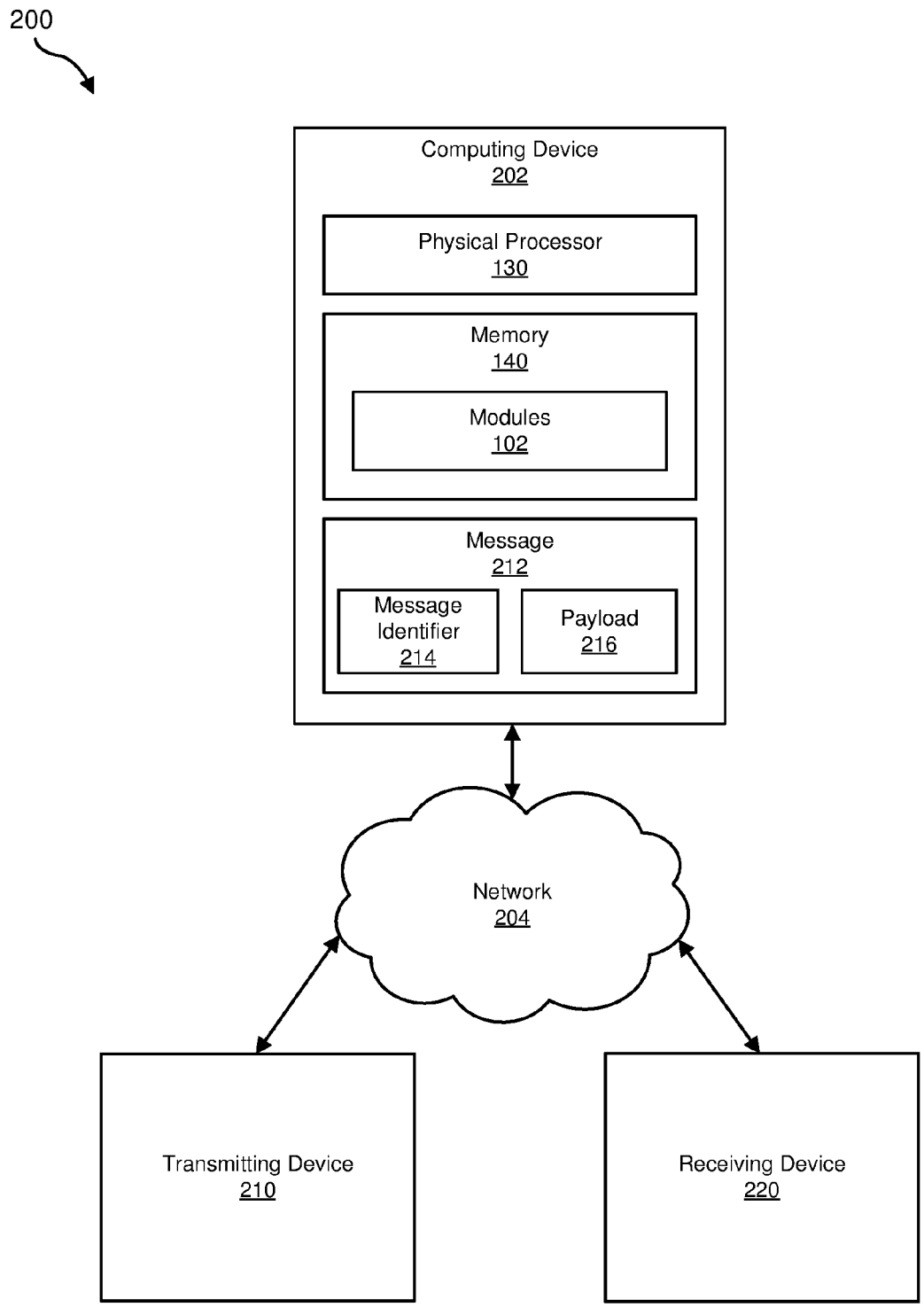
FIG. 2 is a block diagram of an additional example system for identifying message payload bit fields in electronic communications.

The following will provide, with reference to FIGS. 1-2, detailed descriptions of example systems for identifying message payload bit fields in electronic communications. Detailed descriptions of corresponding computer-implemented methods will also be provided in connection with FIG. 3. Detailed descriptions of exemplary message payloads that include bit fields that are identified by the one or more of the systems and/or methods described herein will be provided in connection with FIGS. 4-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for identifying message payload bit fields in electronic communications. As illustrated in this figure, exemplary system 100 may include one or more modules 102 for performing one or more tasks. As will be explained in greater detail below, modules 102 may include a monitoring module 104 that monitors, at a computing device, messages transmitted via a network. Exemplary system 100 may additionally include a selecting module 106 that selects, at the computing device, a plurality of messages transmitted via the network, each of the plurality of messages comprising an identical message identifier corresponding to a specified message type having a payload. Exemplary system 100 may also include a determining module 108 that determines, at the computing device, for each bit position in the payload of the specified message type, a quasi-entropy value based on a proportion of occurrences of a first bit value and a proportion of occurrences of a second bit value at each corresponding bit position in the plurality of messages.

Exemplary system 100 may further include an identifying module 110 that identifies, at the computing device, at least one of a near-random bit field, a periodic bit field, and a constant bit field within the specified message type based on the determined quasi-entropy values. Exemplary system 100 may additionally include a generating module 112 that generates a model based on at least one identified continuous bit field and at least one of the near-random bit field, the periodic bit field, and the constant bit field. In one example, system 100 may include a performing module 114 that performs an action, such as a security action and/or a safety action, in response to determining that a message includes an anomaly in one or more identified bit fields. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, transmitting device 210, and/or receiving device 220). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate identifying message payload bit fields in electronic communications. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a transmitting device 210 and a receiving device 220 via a network 204. In one example, all or a portion of the functionality of modules 102 may be performed by computing device 202, transmitting device 210, receiving device 220, and/or any other suitable computing system.

As will be described in greater detail below, one or more of modules 102 from FIG. 1 may, when executed by at least one processor of computing device 202, transmitting device 210, and/or receiving device 220, enable computing device 202, transmitting device 210, and/or receiving device 220 to identify message payload bit fields in electronic communications transmitted over network 204. For example, and as will be described in greater detail below, one or more of modules 102 may enable computing device 202 to identify message payload bit fields in electronic communications transmitted between transmitting device 210 and receiving device 220.

In at least one embodiment, and as will be described in greater detail below, monitoring module 104 may monitor, at computing device 202, messages transmitted via network 204. For example, monitoring module 104 may monitor messages, such as a message 212, transmitted from transmitting device 210 to receiving device 220 via network 204. As illustrated in FIG. 2, message 212 transmitted via network 204 may be received at computing device 202. Message 212 may include a message identifier 214 and a payload 216. In some embodiments, and as will be described in greater detail below, selecting module 106 may select, at computing device 202, a plurality of messages 212 transmitted via network 204, each of the plurality of messages 212 comprising an identical message identifier 214 corresponding to a specified message type having a payload 216.

In some embodiments, determining module 108 may determine, at computing device 202, for each bit position in payload 216 of the specified message type, a quasi-entropy value based on a proportion of occurrences of a first bit value and a proportion of occurrences of a second bit value at each corresponding bit position in the plurality of messages 212. Determining module 108 may also determine, at computing device 202, for each bit position of a plurality of bit positions in payload 216 of the specified message type, a bit flip rate value based on the occurrences of the first bit value and the occurrences of the second bit value at each corresponding bit position in the plurality of messages. Identifying module 110 may identify, at computing device 202, at least one of a near-random bit field, a periodic bit field, and a constant bit field within the specified message type based on the determined quasi-entropy values. Additionally, identifying module 110 may identify, at computing device 202, at least one continuous bit field within the specified message type based on the determined bit flip rate values.

Computing device 202 generally represents any type or form of computing device capable of reading computer-executable instructions. Examples of computing device 202 include, without limitation, on-board computers (e.g., automotive on-board computers, etc.), laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, representative computing system 710 in FIG. 7, or any other suitable computing device. In one example, computing device 202 may include one or more servers, such as security servers, application servers, web servers, storage servers, and/or database servers configured to run certain software applications and/or provide various security, web, storage, and/or database services. Although illustrated as a single entity in FIG. 2, computing device 202 may include and/or represent a plurality of computing devices that work and/or operate in conjunction with one another.

Transmitting device 210 generally represents any type or form of computing device capable of reading computer-executable instructions and transmitting messages to one or more other computing devices via a network. Examples of transmitting device 210 include, without limitation, electronic control units (ECUs), on-board computers, laptops, tablets, desktops, servers, cellular phones, PDAs, multimedia players, embedded systems, wearable devices (e.g., smart watches, smart glasses, etc.), gaming consoles, combinations of one or more of the same, representative computing system 710 in FIG. 7, or any other suitable computing device.

Receiving device 220 generally represents any type or form of computing device capable of reading computer-executable instructions and receiving messages to one or more other computing devices via a network. Examples of transmitting device 210 include, without limitation, ECUs, on-board computers, laptops, tablets, desktops, servers, cellular phones, PDAs, multimedia players, embedded systems, wearable devices (e.g., smart watches, smart glasses, etc.), gaming consoles, combinations of one or more of the same, representative computing system 710 in FIG. 7, or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, a Controller Area Network (CAN), an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
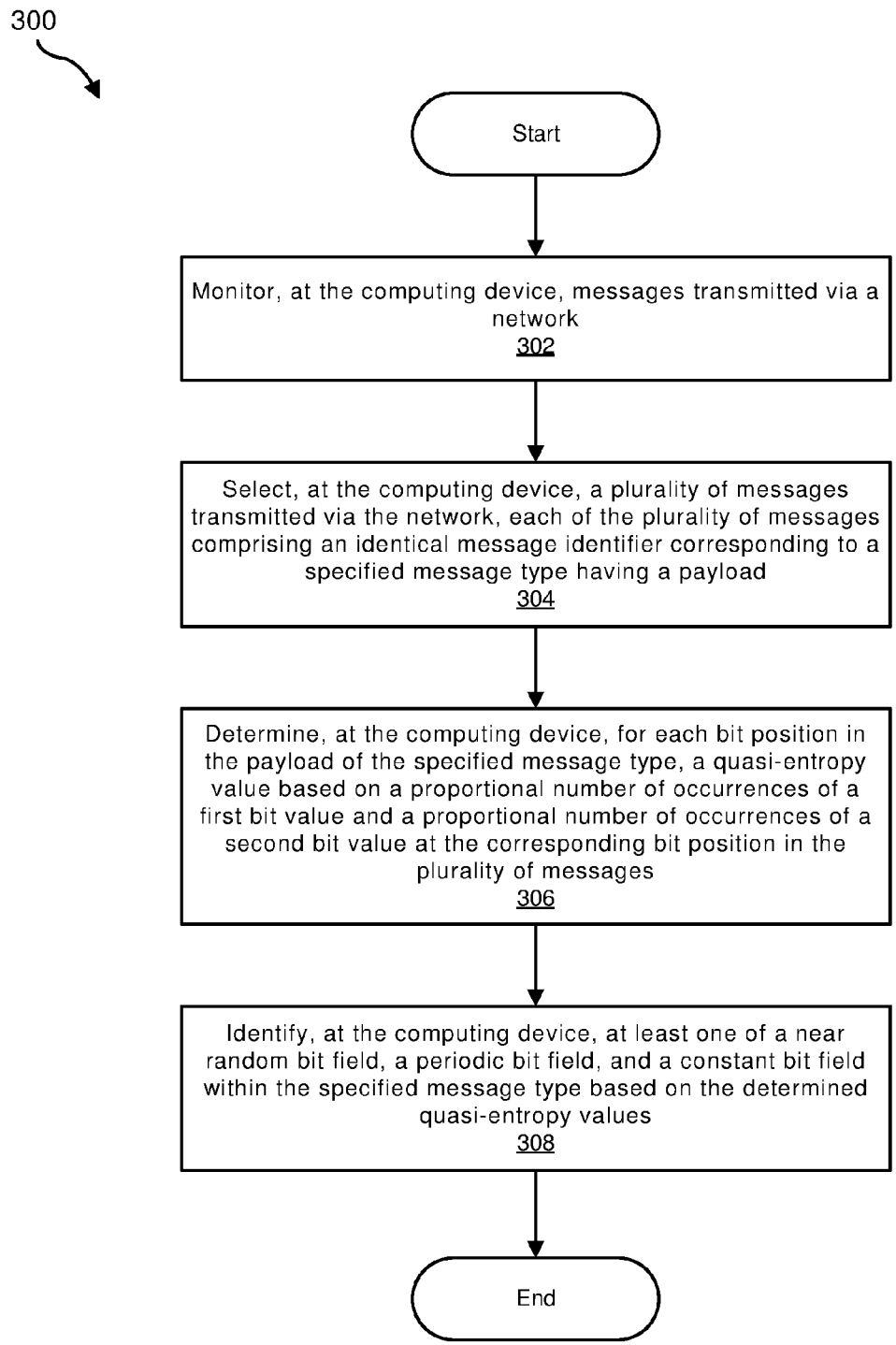
FIG. 3 is a flow diagram of an example method for identifying message payload bit fields in electronic communications.

FIG. 3 is a flow diagram of an example computer-implemented method 300 for identifying message payload bit fields in electronic communications. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may monitor, at a computing device, messages transmitted via a network. For example, monitoring module 104 may, as part of computing device 202 in FIG. 2, monitor messages transmitted via two or more devices via network 204. In some example, monitoring module 104 may monitor messages transmitted from transmitting device 210 illustrated in FIG. 2 to computing device 202 and/or receiving device 220.

Monitoring module 104 may monitor messages transmitted via network 204 in a variety of contexts. For example, network 204 may comprise a network that transmits any type of bit-based communications between two or more computing devices. Monitoring module 104 may be located on a computing device 202 to which the communications are directed and/or may monitor communications directed to other computing devices, such as transmitting device 210 and/or receiving device 220. In some embodiments, monitoring module 104 may monitor all communications or a selected portion of communications that passes through network 204. For example, monitoring module 104 may periodically sample communications passing through network 204 and/or may monitor all communications of a certain type and/or that are directed to a specified computing device, such as computing device 202, transmitting device 210, and/or receiving device 220.

According to at least one embodiment, monitoring module 104 may monitor messages transmitted via a network 204 that carries messages over a CAN bus system. Such a CAN bus system may be utilized, for example, in a vehicle (e.g., an automobile, boat, aircraft, etc.) to transmit messages between two or more devices within the vehicle. For example, an automotive CAN bus system may transmit binary messages between various Electronic Control Units (ECUs) and/or an on-board computing system in an automobile according to a standardized CAN protocol for in-vehicle network communications.

The terms "Electronic Control Unit" and "ECU" as used herein generally refer to an independent functional computing device that is located within a vehicle and that is connected to other devices via a CAN bus system. ECUs may include a host processor (e.g., central processing unit, microprocessor, etc.) and a CAN controller for sending and receiving messages. Examples of ECUs include, without limitation, heating, ventilation and air conditioning (HVAC) modules, brake control modules, self-parking modules, entertainment head modules, door control modules, engine control modules, powertrain control modules, transmission control modules, timing modules, electronic modules, body control modules, suspension control modules, power steering control modules, seat control modules, human-machine interface modules, speed control modules, telematic control modules, and battery management modules.

Binary messages transmitted via network 204 may each include a message identifier and a payload. For example, message 212 illustrated in FIG. 2 includes a message identifier 214 and a payload 216. The message identifier 214 may indicate a type of message for message 212. For example, in at least one embodiment, message identifier 214 may comprise a Bus ID that is associated with a particular CAN bus and/or a CAN ID that is associated with a particular CAN message type transmitted by an ECU within a vehicle. Messages 212 sharing a common message identifier 214 may have a common sub-format in the payload 216 regions of those messages 212. For example, as will be discussed in greater detail below, payloads 216 of messages 212 sharing a common message identifier 214 may have the same or substantially the bit field boundaries. In some embodiments, common payload bit fields within payloads 216 of messages 212 may share common and/or predictable characteristics in each of the messages 212.

At step 304, one or more of the systems described herein may select, at the computing device, a plurality of messages transmitted via the network, each of the plurality of messages comprising an identical message identifier corresponding to a specified message type having a payload. For example, selecting module 106 may, as part of computing device 202 in FIG. 2, select a plurality of messages 212 that are transmitted from transmitting device 210 to receiving device 220 via network 204. Each of the plurality of transmitted messages 212 may have an identical message identifier 214 corresponding to a specified message type having a payload.

Selecting module 106 may select the plurality of messages 212 transmitted via network 204 in a variety of contexts. According to at least one embodiment, monitoring module 104 may monitor all or a substantial portion of traffic transmitted via network 204 during a monitoring period and may identify multiple messages having various message identifiers. Selecting module 106 may select a plurality of messages 212 out of all the messages monitored, the plurality of messages 212 each having an identical message identifier 214. In some examples, selecting module 106 may also select, out of all the messages monitored, other groups of messages respectively sharing a common message identifier. According to one embodiment, the various message identifiers may be CAN IDs and/or Bus IDs associated with different ECUs linked to a CAN bus system.

The identical message identifier 214 of each of the plurality of messages 212 may indicate that messages 212 are all of the same message type. Because messages 212 are the same message type, they may share common characteristics, such as a common sub-format. The common message identifier 214 of messages 212 may also indicate that messages 212 are each transmitted from a common source, such as transmitting device 210. In some examples, the common message identifier 214 may indicate that messages 212 are conveying a common type of information in payload 216, even though the content of payload 216 itself may differ in each individual message 212. For example, messages 212 having message identifier 214 may each share common bit fields and bit field boundaries within payload 216, although the actual contents of one or more of the bit fields in payload 216 may vary between each of messages 212. Certain bit fields in payload 216 may, for example, contain variable information that changes between different messages 212 of the same message type, while other bit fields in payload 216 may contain information that is constant from message to message.

According to various embodiments, selecting module 106 may select the plurality of messages 212 based only on the common message identifier 214 without determining what the common message identifier 214 represents. For example, selecting module 106 may group the plurality of messages 212 based only on the common message identifier 214, without regard to the source of messages 212 and without identifying what type of information (e.g., sensor data, instructions, etc.) messages 212 are ultimately conveying. Message identifier 214 may, for example, be an identifier for messages 212 that convey vehicle sensor data transmitted from a particular vehicle ECU. Selecting module 106 may simply group the plurality of messages 212 based only on the identical message identifier without determining what ECU transmitted the plurality of messages and/or without determining the specific nature of the vehicle sensor data or other data contained in the messages.

At step 306, one or more of the systems described herein may determine, at the computing device, for each bit position in the payload of the specified message type, a quasi-entropy value based on a proportion of occurrences of a first bit value and a proportion of occurrences of a second bit value at each corresponding bit position in the plurality of messages. For example, determining module 208 may, as part of computing device 202 in FIG. 2, determine for each bit position in the payload of the specified message type, a quasi-entropy value based on a proportion of occurrences of a first binary bit value (e.g., "0") and a proportion of occurrences of a second binary bit value (e.g., "1") at each corresponding bit position in the plurality of messages 212.

As used herein, the term "quasi-entropy" generally refers to a normalized near-linear variant of Shannon entropy that represents the expected value of information (e.g., binary bit-states) at each bit position in a message of a particular message type. Quasi-entropy values range from a low quasi-entropy value of "0," representing no variation in bit values at a particular bit position in a selected message type, to a high quasi-entropy value of "1," representing a maximum amount of variation in bit values at a particular bit position in a selected message type. Quasi-entropy values for a selected message type are determined based on analysis of a sample group of messages of the selected message type. In contrast to calculations utilized for determining Shannon entropy, quasi-entropy calculations do not require taking summed logarithms of bit-state probabilities.

Figure 4:
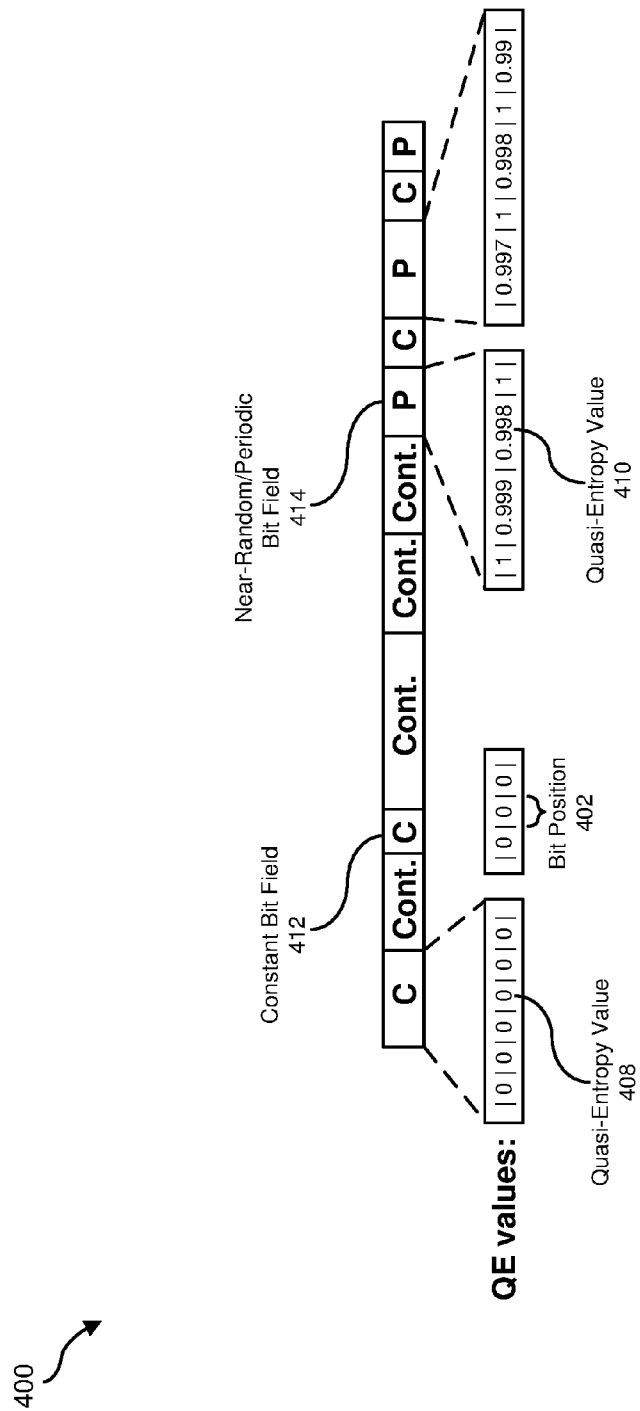
FIG. 4 is an illustration of an exemplary message payload that includes bit fields that are identified by the one or more of the systems and/or methods described and/or illustrated herein.

FIG. 4 is an illustration of a representative message payload 400 that includes various bit fields. For example, as illustrated in FIG. 4, message payload 400 of a particular message type may include one or more constant bit fields "C," continuous bit fields "cont.," and near-random and/or periodic bit fields "P." Initially, the locations of the constant bit fields, the continuous bit fields, and the near-random and/or periodic bit fields may be unknown. In order to determine the locations of the various bit fields in message payload 400, determining module 108 may analyze payload bit values in a plurality of messages of the same message type (e.g., a plurality of selected messages 212 sharing the common message identifier 214). For example, for messages of a particular message type, the systems and methods described herein may analyze payload bit values for each of the plurality of messages 212 at each corresponding bit position.

In one embodiment, the disclosed systems and methods may calculate quasi-entropy values at each bit position of a specified message type based on bit values at each corresponding bit position in a plurality of sampled messages of the specified message type. In at least one embodiment, message payloads 216 of messages 212 of a specified message type may be aggregated into a row matrix such that each column (i.e., bit column) of the row matrix corresponds to a particular bit position of the specified message type. A quasi-entropy value may then be calculated for each bit column of the row matrix, the calculated quasi-entropy value for each bit column representing the quasi-entropy for the corresponding bit position in the specified message type. In some embodiments, the calculated quasi-entropy values may be stored in the matrix in a designated quasi-entropy row vector such that the quasi-entropy values in the quasi-entropy row vector are located in the corresponding bit columns of the row matrix.

Determining module 208 may calculate quasi-entropy values for each bit position in the payload of the specified message type in a variety of contexts. For example, determining module 208 may calculate quasi-entropy values for each of the bit positions in message payload 400 of a specified message type based on a proportion of occurrences (i.e., probability) of a first bit value (e.g., "0") and a proportion of occurrences (i.e., probability) of a second bit value (e.g., "1") at each corresponding bit position in the plurality of messages 212. In at least one embodiment, determining module 208 may aggregate a sufficient number of samples of payloads 216 from messages 212 of the specified message type into a row matrix in order to calculate the quasi-entropy values in each of the bit positions of message payload 400. In some embodiments, determining module 208 may calculate each of the quasi-entropy values by multiplying a relative proportion of the first bit value at each corresponding bit position in the plurality of messages by a relative proportion of the second bit value at each corresponding bit position in the plurality of messages 212.

In one embodiment, determining module 208 may calculate each of the quasi-entropy values for each of the bit positions in message payload 400 of the specified message type according to the following Equation (1):

$$QE = K \times (p_0 \times p_1)^2 \quad (1)$$

where "QE" is the quasi-entropy value, "K" is a constant value, "$p_0$" is a ratio of the total number of occurrences of the first bit value to the total number of messages of the plurality of messages, and "$p_1$" is a ratio of the total number of occurrences of the second bit value to the total number of messages of the plurality of messages. In at least one example, K may have a value of 16. Equation (1) may, for example, be utilized to calculate quasi-entropy values for each bit column of a row matrix of payloads 216 to obtain quasi-entropy values for each bit position of the specified message type. In some examples, variable $p_0$ of Equation (1) may represent an estimated bit-state probability for a first bit value (e.g., "0") in a bit column of the row matrix and variable $p_1$ of Equation (1) may represent an estimated bit-state probability for a second bit value (e.g., "1"). In some examples, $p_0$ may be calculated for each bit column of the row matrix according to the following Equation (2):

$$p_0 = \frac{\text{number of "0" bit states in bit column}}{\text{total number of bits in bit column}} \quad (2)$$

Additionally, $p_1$ may be calculated according to the following Equation (3):

$$p_1 = \frac{\text{number of "1" bit states in bit column}}{\text{total number of bits in bit column}} \quad (3)$$

Alternatively, $p_1$ may be calculated by subtracting $p_0$ from 1, or $p_0$ may be calculated by subtracting $p_1$ from 1. As shown in FIG. 4, calculated quasi-entropy values (e.g., quasi-entropy values 408 and 410) may be calculated for each bit position 402 of message payload 400.

At step 308, one or more of the systems described herein may identify, at the computing device, at least one of a near-random bit field, a periodic bit field, and a constant bit field within the specified message type based on the determined quasi-entropy values. For example, identifying module 110 may, as part of computing device 202, identify at least one of a constant bit field 412 and a near-random/periodic bit field 414 based on the quasi-entropy values determined by determining module 108.

Identifying module 110 may select the identify the bit fields in message payload 400 of the specified message type in a variety of contexts. For example, identifying module 110 may identify at least one constant bit field 412 in message payload 400 by identifying at least one bit position 402 having a quasi-entropy value 408 of "0" or a quasi-entropy value 408 that is less than or equal to a maximum predetermined threshold value. For example, as shown in FIG. 4, identifying module 110 may identify a constant bit field 412 by identifying a plurality of adjacent bit positions 402 having a quasi-entropy value 408 of "0". The boundaries of constant bit field 412 may be determined by identifying the bit positions 402 in constant bit field 412 that are adjacent bit fields 402 having non-zero quasi-entropy values.

Identifying module 110 may identify at least one near-random/periodic bit field 414 in message payload 400 by identifying at least one bit position 402 having a quasi-entropy value 410 of "1" or a quasi-entropy value 410 that is greater than or equal to a predetermined threshold. For example, identifying module 110 may identify a near-random/periodic bit field 414 by identifying a plurality of adjacent bit positions 402 having a quasi-entropy value 410 at or exceeding a predetermined threshold. The predetermined threshold value may be set to any suitable quasi-entropy value, such as, for example, a quasi-entropy value approaching a value of "1." As shown in FIG. 4, a predetermined threshold value of, for example, 0.997 may be used. The boundaries of near-random/periodic bit field 414 may be determined by identifying the bit positions 402 in near-random/periodic bit field 414 that are adjacent bit fields 402 having quasi-entropy values that are below the predetermined threshold value. In at least one example, identifying module may not specifically determine whether near-random/periodic bit field 414 is a near-random bit field or a periodic bit field based on the determined quasi-entropy values since near-random bit fields and period bit fields may both have similar quasi-entropy values that are greater than or equal to the predetermined threshold. Moreover, it may be unnecessary to determine whether a bit field is either a near-random bit field or a periodic bit field for purposes of anomaly detection. In some embodiments, the described systems and methods may determine whether a particular near-random/periodic bit field is a near-random bit field or a periodic bit field.

Figure 5:
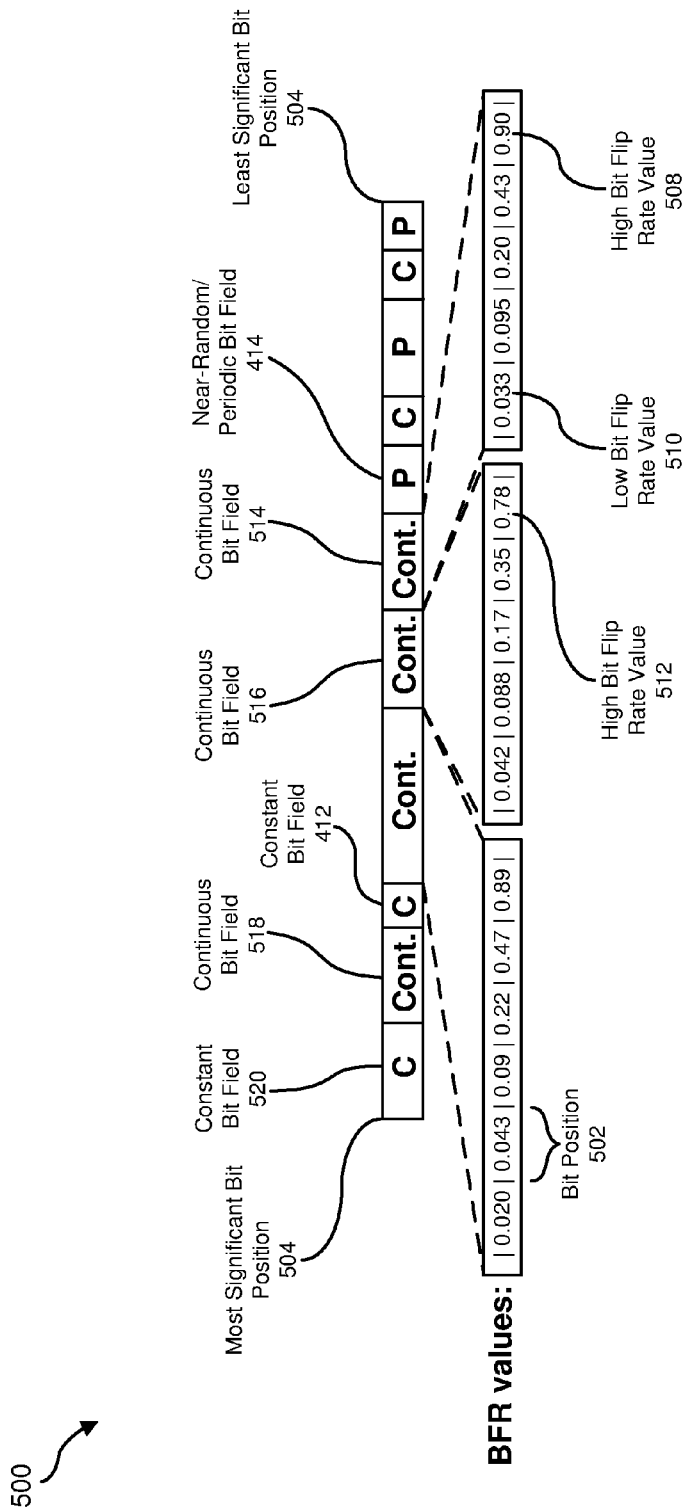
FIG. 5 is an illustration of an exemplary message payload that includes bit fields that are identified by the one or more of the systems and/or methods described and/or illustrated herein.

FIG. 5 is an illustration of the representative message payload 400 shown in FIG. 4. After the quasi-entropy values of each of the bit positions in message payload 400 for a particular message type are determined and the constant bit fields 412 and/or near-random/periodic bit fields 414 are identified, as discussed above, determining module 108 may, as part of computing device 202, calculate a bit-flip rate value for each of a plurality of bit positions in message payload 400. In one embodiment, determining module 108 may determine a bit flip rate for each of the bit positions in message payload 400. In some embodiments, determining module 108 may only determine bit flip rate values for bit positions in message payload 400 that are not in one of the identified constant bit fields 412 or near-random/periodic bit fields 414, thereby reducing a processing load for calculating the bit field rate values.

While the constant bit fields 412 and/or near-random/periodic bit fields 414 may be identified based on quasi-entropy values of the bit locations within each of the respective constant bit fields 412 and/or near-random/periodic bit fields 414 as described above, the quasi-entropy values may not be useful for identifying the locations and boundaries of one or more continuous bit fields in message payload 400. In at least one embodiment, in order to determine the locations of one or more continuous bit fields in message payload 400, determining module 108 may analyze payload bit values in a plurality of messages of the same message type to determine bit flip rate values for each bit position.

As used herein, the term "bit flip rate" generally refers to a calculated rate at which bits in a particular bit position or row matrix bit column change between a first bit value (e.g., "0") and a second bit value (e.g., "1") in consecutive payloads. Bit flip rate values for a selected message type are determined based on analysis of a sample group of messages of the selected message type.

In some embodiments, message payloads 216 of a plurality of messages 212 of a specified message type may be aggregated into a row matrix (such as the row matrix described above) in a specified order, such as, for example, a chronological order in which messages 212 are received by computing device 206. A bit flip rate value may then be calculated for each of a plurality of bit columns of the row matrix, the calculated bit flip rate value for each of the plurality of bit columns representing the bit flip rate for the corresponding bit position in the specified message type. In some embodiments, the calculated bit flip rate values may be stored in the matrix in a designated bit flip rate row vector such that the bit flip rate values in the bit flip rate row vector are located in the corresponding bit columns of the row matrix.

Determining module 208 may calculate bit flip rate values for bit positions in the payload of the specified message type in a variety of contexts. For example, determining module 208 may calculate bit flip rate values for each of a plurality of bit positions in message payload 400 of a specified message type based on occurrences of a first bit value (e.g., "0") and occurrences of a second bit value (e.g., "1") at each corresponding bit position in the plurality of messages 212. In one embodiment, determining module 208 may calculate each of the bit flip rate values for each of the bit positions in message payload 400 of the specified message type according to the following Equation (4):

$$BFR = \frac{\text{total number of bit flips}}{\text{total number of bits in bit column}} \quad (4)$$

where "BFR" is the bit flip rate value. Equation (4) may be utilized to calculate bit flip rate values for each bit column of a row matrix of payloads 216 to obtain bit flip rate values for each bit position of the specified message type.

The bit flips referred to in Equation (4) represent instances in which a bit value at a particular bit position or bit column of a specified message type changes between a first bit value and a second bit in consecutive payloads (e.g., payloads 216 that are adjacent to each other in a row matrix that is organized chronologically). According to one embodiment, a flip for a particular bit position may be determined according to the following Equation (5):

$$\text{flip}(i, t) = \begin{cases} 0, & d(i, t) = d(i, t-1) \\ 1, & d(i, t) \neq d(i, t-1) \end{cases} \quad (5)$$

where "i" refers to the particular bit position in the message type, "t" refers to a time interval, and "t−1" refers to a time interval prior to time interval "t" (e.g., "t−1" may refer a time interval immediately preceding time interval "t"). The total number of bit flips for each bit position in the payload of the specified message type is calculated by summing the bit flips determined according to Equation (5) at each bit position.

In at least one embodiment, identifying module 110 may, as part of computing device 202, identify at least one continuous bit field within message payload 400 of the specified message type based on the determined bit flip rate values for each bit position in the payload of the specified message type. For example, identifying module 110 may analyze bit flip rate values for bit positions 502 that are not within a constant bit field or a near-random/periodic bit field.

In some embodiments, identifying module 110 may analyze bit positions 502 in message payload 400 by proceeding in a direction from a least significant bit 504 to a most significant bit 506 of message payload 400. Identifying module 110 may, for example, determine that a bit position 502 that is directly adjacent to near-random/periodic bit field 414 is a boundary bit position of a continuous bit field 514. The bit position in continuous bit field 514 directly adjacent to near-random/periodic bit field 414 may be identified as the least significant bit position in continuous bit field 514. In at least one embodiment, the bit flip rate value for the least significant bit position in each continuous bit field may a have the highest bit flip rate value in the corresponding continuous bit field. For example, as shown in FIG. 5, the least significant bit position in continuous bit field 514, which is adjacent to near-random/periodic bit field 414, may have a bit flip rate value 508 of 0.90. Bit flip rate values for continuous bit field 514 may progressively decrease when moving bit-wise from the least significant bit position to the most significant bit position in continuous bit field 514. For example, bit flip rate values of bit positions 502 in continuous bit field 514 may decrease from the high bit flip rate value 508 of 0.90 to a low bit flip rate value 510 of 0.033 at the least significant bit position in bit field 514.

In one embodiment, identifying module 110 may determine a boundary between a continuous bit field and another continuous bit field based on a sudden increase in bit flip rate between adjacent bit positions 502. For example, a boundary between continuous bit field 514 and an adjacent continuous bit field 516 may be determined based on a sudden increase from low bit flip rate value 510, which has a value of 0.033, to a high bit flip rate value 512 having a value of 0.78 at an adjacent bit position 502. Identifying module 110 may identify the bit position 502 having the low bit flip rate value 510 of 0.033 as being a boundary bit position of continuous bit field 514 (i.e., the most significant bit position of continuous bit field 514). Additionally, identifying module 110 may identify the bit position 502 having the high bit flip rate value 512 of 0.78 as being a boundary bit position of continuous bit field 516 (i.e., the least significant bit position of continuous bit field 516).

In some embodiments, a single continuous bit field may be determined to border a constant bit field and/or a near-random/periodic bit field. For example, as shown in FIG. 5, a continuous bit field 518 may be determined to border a constant bit field 412 and a constant bit field 520 with no additional continuous bit field disposed between continuous bit field 412 and constant bit field 520. Identifying module 110 may determine that only continuous bit field 518 is located between constant bit field 412 and constant bit field 520 due to the absence of a sudden increase in bit flip rate value in adjacent bit positions 502 of continuous bit field 518 when the bits are analyzed progressively in a bit-wise direction from a least significant bit position to a most significant bit position of continuous bit field 518.

According to various embodiments, one or more of the systems described herein may generate, at the computing device, a model based on the at least one continuous bit field and the at least one of the near-random bit field, the periodic bit field, and the constant bit field. For example, generating module 112 may, as part of computing device 202, generate a model based on at least one of a continuous bit field (e.g., continuous bit fields 514, 516, and 518 illustrated in FIG. 5), a near-random/periodic bit field (e.g., near-random/periodic bit field 414 illustrated in FIGS. 4 and 5), and/or a constant bit field (e.g., constant bit fields 412 and 520 illustrated in FIGS. 4 and 5) in a message payload 400 of a specified message type. In some examples, generating module 112 may generate a set of rules for one or bit fields. For example, generating module 112 may specify, for example, maximum or minimum bit values, ranges of bit values, rates of change, and/or differences in values for characteristics of bit values in bit positions within the modeled bit fields of a specified message type. In some embodiments, a set of rules may be directed to maximum or minimum values, ranges of values, and/or rates of change of quasi-entropy values and/or bit flip rate values of bit positions within the modeled bit fields.

In one embodiment, one or more of the systems described herein may (i) detect, at the computing device, an additional message of the specified message type transmitted via the network, and (ii) determine, at the computing device, based on a generated model, whether the additional message includes at least one anomaly. For example, monitoring module 104 may, as part of computing device 202, detect an additional message 212 of a message type that includes a particular payload (e.g., message payload 400 illustrated in FIGS. 4 and 5) that is transmitted via network 204. Determining module 108, may then, as part of computing device 202, determine, based on a generated model of the particular message type, whether the additional message 212 includes at least one anomaly. For example, determining module 108 may determine whether one or more of a constant bit field, a near-random/periodic bit field, and a continuous bit field in the additional message 212 varies from a range of specified values for the one or more fields based on the model for the message type. Determining module 108 may also monitor other characteristics of additional messages of the specified message type to look for various trends, such as a rate of change of bit values, in one or more of the identified bit fields.

According to some embodiments, determining module 108 may determine whether bit values of bit positions in at least one constant bit field of one or more additional messages of the specified message type vary from a modeled constant value for the constant bit field. Determining module 108 may determine a rate of change in bit values of bit positions in at least one near-random bit field and/or at least one periodic bit field of the additional messages of the specified message type in comparison with the model for the message type. In some examples, determining module 108 may analyze the bit values in the at least one near-random bit field and/or at least one periodic bit field of the additional messages to determine whether quasi-entropy values remain at or above a threshold value. Additionally, determining module 108 may analyze at least one continuous bit field of the additional messages of the specified message type in comparison with the model for the message type to determine whether bit flip rate values within the at least one continuous bit field of the additional messages is within a modeled range of bit flip rate values. In at least one example, determining module 108 may analyze a rate of change of bit flip rate values in the at least one continuous bit field of the additional messages of the specified message type in comparison with the model for the message type. Such a rate of change in bit flip rate values may be determined, for example, using a derivate-based analysis (e.g., analysis of first derivatives, second derivatives, etc.) of the bit flip rate values. In various embodiments, generating module 112 may periodically or continuously update a model as additional messages are received by monitoring module 104.

According to various embodiments, one or more of the systems described herein may perform, at the computing device, a security action in response to determining that an additional message includes at least one anomaly. For example, performing module 114 may, as part of computing device 202, perform a security action in response to determining that one or more additional messages include at least one anomaly.

Performing module 114 may perform a variety of security actions, and in a variety of ways. In general, performing module 114 may perform any suitable action on an anomalous message that may be a suspicious or potentially harmful messages transmitted via network 204 to reduce the potential threat to information security and/or computing devices. For example, performing module 114 may block transmission of the anomalous message to a target computing device. Additionally or alternatively, performing module 114 may submit the anomalous message to a security service for further analysis. For example, a security service may analyze the message to determine whether the message includes malicious data and/or was generated by a malicious process. In one embodiment, the security action may include using the assigned classification to prioritize a security analysis of the anomalous message and/or a computing device that transmitted the anomalous message.

In at least on example, a CAN message transmitted via a CAN bus system that is determined to be anomalous may be determined to be indicative of access by a malicious party to a CAN bus system and/or to one or more devices connected to the CAN bus system. In additional embodiments, the anomalous CAN message may be an indicator of a malfunctioning or otherwise defective device (e.g., a faulty ECU). In some examples, performing module 114 may notify a user of a vehicle (e.g., an automobile) utilizing the CAN bus system that the anomalous message was detected. The user may be instructed to have the vehicle taken into a maintenance or repair facility for further evaluation to determine a cause of the anomalous message.

As described in greater detail above, the systems and methods described herein may monitor messages that are transmitted via a network and parse message payloads of various message types into arbitrary bit fields of various sizes. The disclosed systems and methods may identify the bit fields in a manner that is computationally efficient and accurate. For example, the use of quasi-entropy calculations and bit flip rate calculations to identify various bit fields may be computationally more efficient than calculating conventional entropy values or attempting to discover a ground truth field schema of the message types through reverse-engineering. The parsed message payloads may be used to model message payload fields for the various message types and monitor subsequent messages for anomalies based on variations in values and patterns detected in the subsequent messages. The described systems and methods may thus be utilized for detecting and modeling a variety of message types, including proprietary message formats and/or otherwise unknown message formats. While specific examples of the described systems and methods have been discussed in relation to messages transmitted via a CAN bus system, the systems and methods may be applied to any suitable message type transmitted via any suitable network, without limitation.

In some embodiments, the systems and method described herein may update message models through training and learning based on continual or periodic monitoring of messages. The described systems and methods may be carried out in manner that is protocol-agnostic so that knowledge of a particular message format or a particular architecture utilizing the messages is not necessary in order to perform the modeling and anomaly detection. Additionally, the systems and methods may be carried out using a software-based solution that does not require the installation of additional hardware. Moreover, the described systems and methods may be carried out in a passive manner that does not require interaction (e.g., packet injections) with a network that is being monitored. Additionally, the systems and methods may be performed in real-time on an active network.

Figure 6:
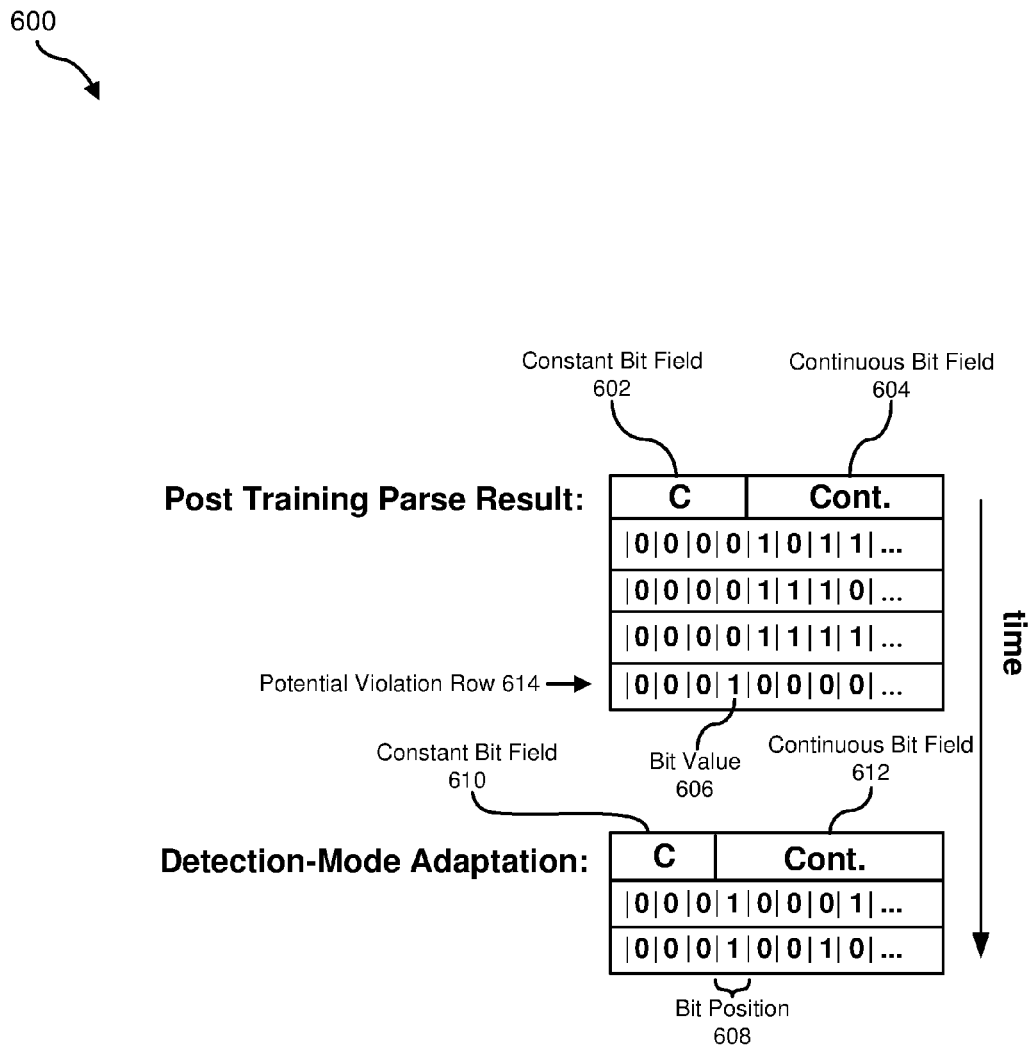
FIG. 6 is an illustration of an exemplary message payload row matrix that includes bit fields that are identified by the one or more of the systems and/or methods described and/or illustrated herein.

In one embodiment, as illustrated in FIG. 6, adaptive behavior may be included to update adjacent payload field class designations in cases where a slowly aggregating variable bit field (i.e., continuous field) encroaches upon the least significant bit position of a constant field. For example, as illustrated in FIG. 6, which shows a payload row matrix 600 for a specified message type organized chronologically, a post-training parse result of a message payload may identify a constant bit field 602 that includes bit positions having bit values of "0" and an adjacent continuous bit field 604. Subsequently, a message in a potential violation row 614 may include a bit value 606 of "1" that is different than the expected bit value of "0" in the least significant bit position at bit position 608 in the constant bit field 602. In response, the modeled bit fields may be updated by a detection-mode adaptation to change the boundaries of constant bit field 610 and continuous bit field 612 such that bit position 608 is identified as the most significant bit position of variable bit field 612. In some examples, a variable bit field may represent a sequential counting number or a physical quantity, such as engine temperature, that may not toggle the most significant bit position values until the engine has been running long past a training phase, leading to the most significant bit position of the variable bit field being misidentified as belonging to a constant bit field in the training phase.

In at least one embodiment, adaptive behavior has may be utilized to update statistical boundaries within class rules for a modeled message type. For example, for a continuous bit field rule, each time a value outside of a [minV:maxV] range, but within a [minV−c*maxDiff:maxV+c*maxDiff] range (where c is a scale factor determined by analysis, minV is a minimum value, maxV is a maximum value, and maxDiff is a maximum difference), a rule may be updated to a [min{minV, value}, max{maxV, value}] rule, or an alert may be issued.

In some embodiments of a comprehensive automotive anomaly detection system, continuous learning may be implemented, whereby alternate modes of training and detection are carried out for a minimum number of initial driving hours. During such a continuous learning mode, alerts may be suppressed while gradual adjustment of payload parsing results may be allowed based on continuity thresholds for monitored statistics. For example, a continuous bit field representing vehicle speed may be allowed adjustments up to min and max rates of change, corresponding to automobile braking and acceleration, as long as predetermined sensitivity thresholds are not exceeded.

In one embodiment, the systems and methods described may include rules generated by determining and modeling payload bit fields in CAN message types transmitted via a CAN bus system. For example, CAN messages having a specified CAN identifier (i.e., CAN bus number and CAN ID) may include the following exemplary rules generated based on determination and modeling of payload bit fields in a plurality of CAN messages:

[# bus id, CAN_id, Payload Length, number of rules]
   1 400 8 9
 [bit range, rule detail]
   48 63 ConstantRule 0 # bit range: 48-63, with constant value of 0
   44 47 PeriodicOrRandomRule # bit range: 44-47, with random value entropy
   40 43 ConstantRule 0 # bit range 40-43, with constant value of 0
   30 39 ContinuousRule 296 889 334 # bit range 30-39, with min_value: 296, max_value: 889, #max_difference_between_consecutive_message: 334
   18 29 ConstantRule 0 # bit range: 18-29, with constant value of 0
   17 17 DiscreteRule 0 1 # bit range: 17-17, with discrete value of 0 and 1
   16 16 ConstantRule 0 # bit range: 16-17, with constant value of 0
   7 15 ContinuousRule 0 480 177 # bit range 7-15, with min_value: 0, max_value: 480, #max_diffence_between_consecutive_message: 177
   0 6 ConstantRule 0 # bit range 0-6, with constant value of 0

In an at least one embodiment, the systems and methods described herein may be implemented to detect anomalies in automotive CAN bus systems. The described systems and methods have been shown, for example, to be capable of consistently detecting message anomalies to a point where zero false-positive and 100% true-positive detection rates have been observed during testing with multiple real-world automotive CAN datasets.

In one embodiment, anomaly detection performance was implemented and tested to determine accuracy of the systems and methods described herein. Anomaly detection performance testing was carried out according to the described systems and methods using a total of 65 data logs of CAN bus message data taken from several FORD and CHRYSLER vehicle test runs. To test true-positive performance, the anomaly detection performance testing utilized four datasets that included 49 crafted anomalous injections that were designed to break known message patterns for modeled CAN messages. The systems and methods detected 49 of the 49 crafted anomalous injections, resulting in a 100% true-positive detection rate. To test false-positive performance, the anomaly detection performance testing looked at 65 total datasets, including the four datasets having the 49 crafted anomalous injections. The systems and methods produced zero false alarms across all 65 datasets, resulting in a 0% false-positive detection rate.

Figure 7:
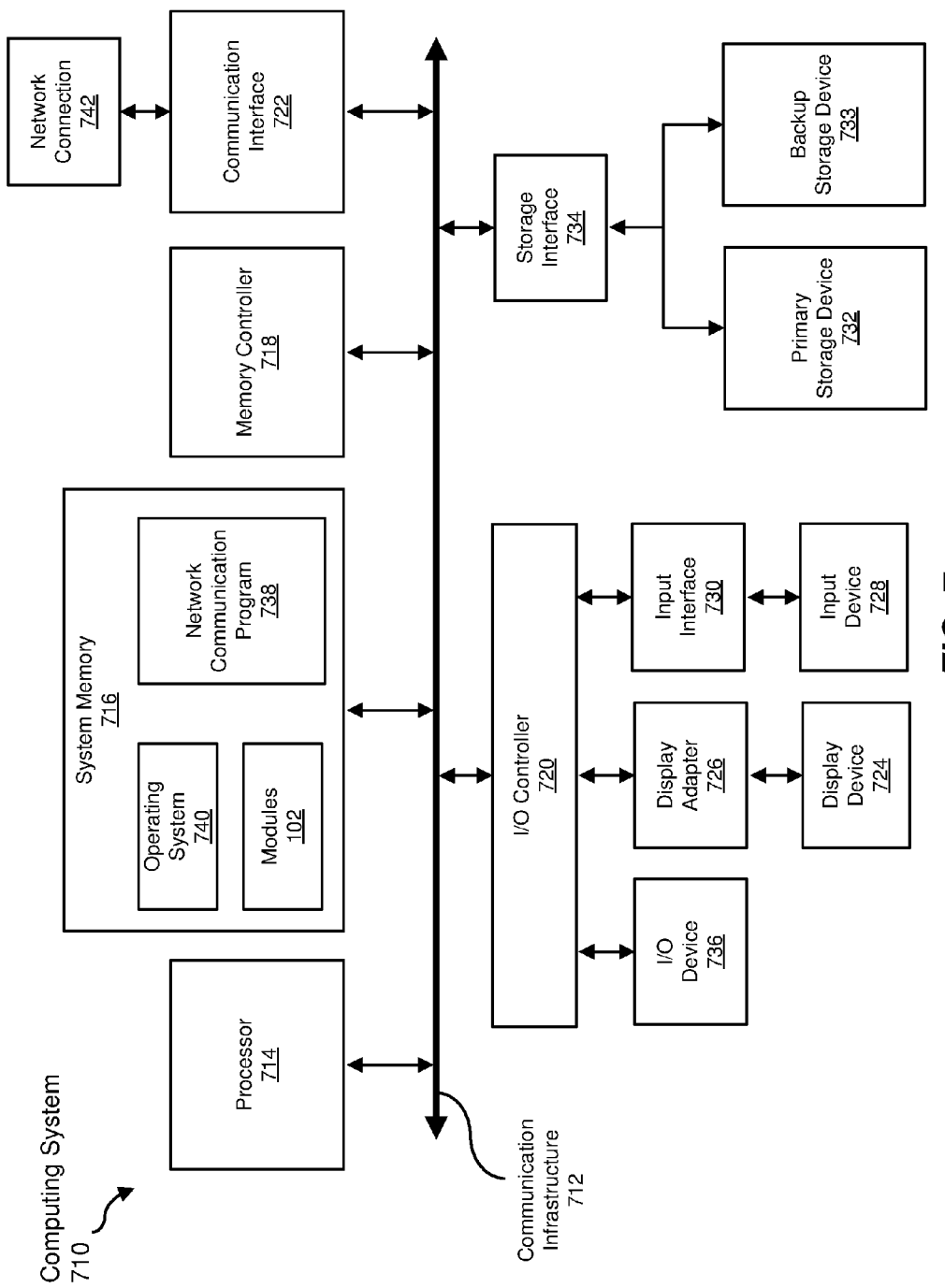
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface

722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
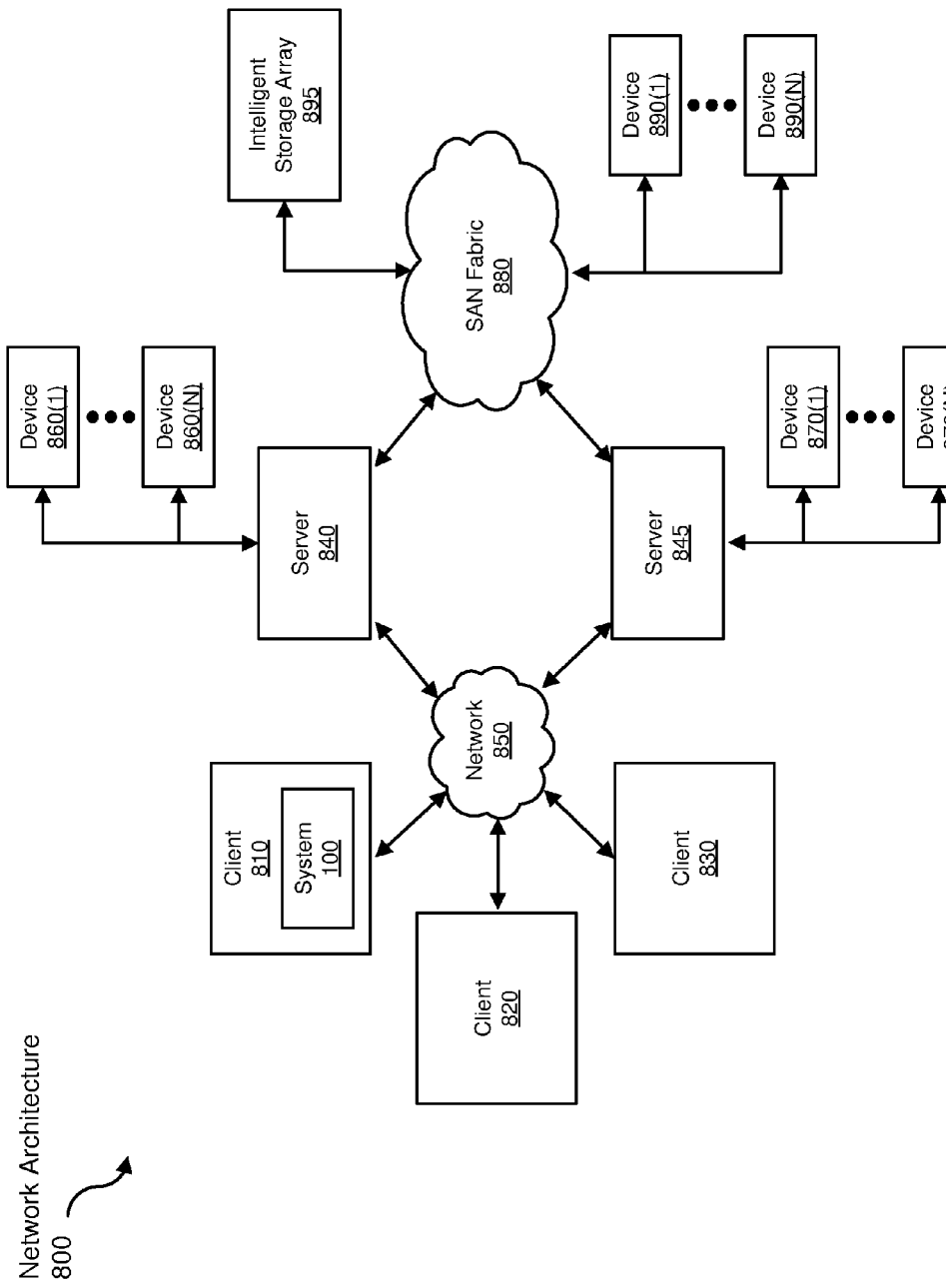
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for identifying message payload bit fields in electronic communications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive message data to be transformed, transform the message data to identify bit fields in the message data using various calculations, including quasi-entropy calculations and/or bit flip rate calculations, use the result of the transformation to monitor and detect anomalies in subsequent message bit fields, and store the results of the transformation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying message payload bit fields in electronic communications, at least a portion of the method being performed by a computing device comprising at least one processor, the method comprising:

monitoring, at the computing device, messages transmitted via a network;

selecting, at the computing device, a plurality of messages transmitted via the network, each of the plurality of messages comprising an identical message identifier corresponding to a specified message type having a payload;

determining, at the computing device, for each bit position in the payload of the specified message type, a quasi-entropy value based on a proportion of occurrences of a first bit value and a proportion of occurrences of a second bit value at each corresponding bit position in the plurality of messages;

identifying, at the computing device, at least one continuous bit field based on bit flip rate values in the payload;

identifying, at the computing device, at least one of a near-random/periodic bit field and a constant bit field within the specified message type based on the determined quasi-entropy values, wherein identifying the near-random/periodic bit field comprises identifying a bit field comprising a plurality of adjacent bit positions each having a quasi-entropy value of 1 and wherein identifying the constant bit field comprise identifying a bit field comprising a plurality of adjacent bit positions each having a quasi-entropy value of 0;

detecting, at the computing device, at least one additional message of the specified message type transmitted via the network; and identifying, at the computing device, at least one anomaly in at least one of the at least one of the near-random/periodic bit field and the constant bit field of the at least one additional message.

2. The method of claim 1, wherein, for each bit position of a plurality of bit positions in the payload of the specified message type, the bit flip rate values are determined based on the occurrences of the first bit value and the occurrences of second bit value at each corresponding bit position in the plurality of messages, wherein the bit flip rate values are for bit positions that are not located within the near-random/periodic bit field or the constant bit field.

3. The method of claim 1, wherein identifying the at least one continuous bit field comprises identifying a boundary of a continuous bit field by detecting an increase in a bit flip rate at a bit position in comparison with an adjacent bit position.

4. The method of claim 3, wherein the bit position at which the increase in the bit flip rate is identified comprises a bit position following the adjacent bit position when proceeding bit-wise from a least significant bit position to a most significant bit position, wherein the least significant bit position comprises the continuous bit field located directly adjacent to the near-random/periodic bit field, and wherein the most significant bit position comprises the continuous bit field located non-adjacent to the near-random/periodic bit field.

5. The method of claim 1, wherein identifying the at least one continuous bit field comprises identifying a boundary of a continuous bit field that is adjacent to the at least one of the near-random/periodic bit field and the constant bit field.

6. The method of claim 1, further comprising generating, at the computing device, a model based on the at least one continuous bit field and the at least one of the near-random/periodic bit field and the constant bit field.

7. The method of claim 6, further comprising:
determining, at the computing device, based on the model, whether the at least one additional message includes the at least one anomaly.

8. The method of claim 6, further comprising performing a security action in response to determining that the at least one additional message includes at least one anomaly.

9. The method of claim 6, further comprising:
updating, at the computing device, the model based on the at least one additional message.

10. The method of claim 9, further comprising changing, at the computing device, a boundary of at least one of the at least one continuous bit field and the at least one of the near-random/periodic bit field and the constant bit field based on the at least one additional message.

11. The method of claim 1, further comprising:
identifying, at the computing device, the at least one of the near-random/periodic bit field and the constant bit field within the at least one additional message.

12. The method of claim 1, wherein the network comprises a controller area network bus.

13. The method of claim 12, wherein the message identifier corresponding to the specified message type comprises a controller area network identifier.

14. The method of claim 1, wherein determining, for each bit position in the payload of the specified message type, the quasi-entropy value further comprises multiplying a relative proportion of the first bit value at each corresponding bit position in the plurality of messages by a relative proportion of the second bit value at each corresponding bit position in the plurality of messages.

15. The method of claim 1, wherein determining, for each bit position in the payload of the specified message type, the quasi-entropy value further comprises calculating the quasi-entropy value according to the following Equation (1):

$$QE = K \times (p_0 \times p_1)^2 \qquad (1)$$

where:
QE is the quasi-entropy value;
K is a constant value;
$p_0$ is a ratio of the total number of occurrences of the first bit value to the total number of messages of the plurality of messages; and
$p_1$ is a ratio of the total number of occurrences of the second bit value to the total number of messages of the plurality of messages.

16. The method of claim 1, wherein identifying at least one of a near-random/periodic bit field and a constant bit field within the specified message type based on the determined quasi-entropy values further comprises identifying two or more consecutive bit fields having a quasi-entropy value that is greater than or equal to a threshold value.

17. The method of claim 1, wherein identifying at least one of a near-random/periodic bit field and a constant bit field within the specified message type based on the determined quasi-entropy values further comprises identifying two or more consecutive bit fields having a quasi-entropy value that is equal to zero.

18. A system for identifying message payload bit fields in electronic communications, the system comprising:
a monitoring module, stored in memory, that monitors, at a computing device, messages transmitted via a network;
a selecting module, stored in memory, that selects, at the computing device, a plurality of messages transmitted via the network, each of the plurality of messages comprising an identical message identifier corresponding to a specified message type having a payload;
a determining module, stored in memory, that determines, at the computing device, for each bit position in the payload of the specified message type, a quasi-entropy value based on a proportion of occurrences of a first bit value and a proportion of occurrences of a second bit value at each corresponding bit position in the plurality of messages;
an identifying module, stored in memory, that:
identifies, at the computing device, at least one continuous bit field based on bit flip rate values in the payload;

identifies, at the computing device, at least one of a near-random/periodic bit field and a constant bit field within the specified message type based on the determined quasi-entropy values, wherein identifying the near-random/periodic bit field comprises identifying a bit field comprising a plurality of adjacent bit positions each having a quasi-entropy value of 1 and wherein identifying the constant bit field comprise identifying a bit field comprising a plurality of adjacent bit positions each having a quasi-entropy value of 0;

detects, at the computing device, at least one additional message of the specified message type transmitted via the network; and identifies, at the computing device, an anomaly in at least one of the at least one of the near-random/periodic bit field and the constant bit field of the at least one additional message; and at least one physical processor that executes the monitoring module, the selecting module, the determining module, and the identifying module.

19. The system of claim 18, wherein, for each bit position of a plurality of bit positions in the payload of the specified message type, the bit flip rate values are determined based on the occurrences of the first bit value and the occurrences of second bit value at each corresponding bit position in the plurality of messages, wherein the bit flip rate values are for bit positions that are not located within the near-random/periodic bit field or the constant bit field.

20. A non-transitory computer-readable medium comprising one or more computer-executable instructions that, when executed by at least one processor of a computing device, cause the computing device to:

monitor messages transmitted via a network;

select a plurality of messages transmitted via the network, each of the plurality of messages comprising an identical message identifier corresponding to a specified message type having a payload;

determine, for each bit position in the payload of the specified message type, a quasi-entropy value based on a proportion of occurrences of a first bit value and a proportion of occurrences of a second bit value at each corresponding bit position in the plurality of messages;

identify at least one continuous bit field based on bit flip rate values in the payload;

identify at least one of a near-random/periodic bit field and a constant bit field within the specified message type based on the determined quasi-entropy values, wherein identifying the near-random/periodic bit field comprises identifying a bit field comprising a plurality of adjacent bit positions each having a quasi-entropy value of 1 and wherein identifying the constant bit field comprise identifying a bit field comprising a plurality of adjacent bit positions each having a quasi-entropy value of 0;

detect at least one additional message of the specified message type transmitted via the network; and identify an anomaly in at least one of the at least one of the near-random/periodic bit field and the constant bit field of the at least one additional message.

* * * * *